United States Patent
Shirakawa

(10) Patent No.: US 10,992,838 B2
(45) Date of Patent: Apr. 27, 2021

(54) SYSTEM FOR EXECUTING PROCESS ASSOCIATED WITH BIOMETRIC INFORMATION, AND METHOD IN SYSTEM, INFORMATION PROCESSING APPARATUS, AND METHOD IN INFORMATION PROCESSING APPARATUS FOR SAME

(71) Applicant: CANON KABUSHIKI KAISHA, Tokyo (JP)

(72) Inventor: Yuki Shirakawa, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/787,152

(22) Filed: Feb. 11, 2020

(65) Prior Publication Data

US 2020/0186676 A1 Jun. 11, 2020

Related U.S. Application Data

(63) Continuation of application No. 16/170,496, filed on Oct. 25, 2018, now Pat. No. 10,609,254.

(30) Foreign Application Priority Data

Nov. 17, 2017 (JP) ................................ 2017-222223

(51) Int. Cl.
*H04N 1/44* (2006.01)
*H04N 1/00* (2006.01)

(52) U.S. Cl.
CPC ....... *H04N 1/4406* (2013.01); *H04N 1/00384* (2013.01)

(58) Field of Classification Search
None
See application file for complete search history.

(56) References Cited

U.S. PATENT DOCUMENTS 8,943,326 B2 1/2015 Tamkhane
8,972,741 B2 3/2015 Awatsu
(Continued)

FOREIGN PATENT DOCUMENTS

JP 2005268951 A 9/2005

OTHER PUBLICATIONS

Office Action issued in U.S. Appl. No. 16/170,496 dated Aug. 21, 2019.
(Continued)

*Primary Examiner* — Thomas D Lee
(74) *Attorney, Agent, or Firm* — Rossi, Kimms & McDowell LLP

(57) ABSTRACT

An MFP stores a plurality of different pieces of biometric information of a user and a plurality of secret keys respectively corresponding to the pieces of biometric information in the TPM and registers public keys corresponding to the private keys in a server. When an authentication request is received from the server, the MFP executes a biometric authentication process using the biometric information input from the user and the biometric information registered in the TPM. If authentication is successful in the biometric authentication process, the MFP creates signature data and transmits it to the server. If verification of the signature data using the public key in the server is successful, the MFP performs display related to a shortcut process associates with the biometric information corresponding to the secret key used when the signature data that is a target of the verification is created by an input and output device.

8 Claims, 16 Drawing Sheets

(56) References Cited

U.S. PATENT DOCUMENTS

2007/0122015 A1     5/2007   Minamizawa
2013/0324089 A1    12/2013   Kim

OTHER PUBLICATIONS

Notice of Allowance issued in U.S. Appl. No. 16/170,496 dated Dec. 4, 2019.

SYSTEM FOR EXECUTING PROCESS ASSOCIATED WITH BIOMETRIC INFORMATION, AND METHOD IN SYSTEM, INFORMATION PROCESSING APPARATUS, AND METHOD IN INFORMATION PROCESSING APPARATUS FOR SAME

BACKGROUND OF THE INVENTION

Field of the Invention

The present invention relates to a system for improving operability at a time at which a network service is used.

Description of the Related Art

In recent years, fast identification online (FIDO) has attracted attention as a new authentication system including biometric authentication. When biometric information such as a fingerprint or vein pattern is used in biometric authentication, a case where information leaks to the outside becomes terminal because the information is not able to be rewritten unlike in conventional passwords for ID/password authentication.

On the other hand, the FIDO performs a registration process in advance between a device in the hand of a user and a server providing a web service. In the registration process, a secret key associated with the biometric information of the user is stored in the device, and information containing information about an authenticator mounted on the device associated with the biometric information, a public key which forms a pair with the secret key and so on is registered in the server. In addition, authentication is performed on the device in the hand of the user, not on the server through the Internet, and an authentication result e-signed using the secret key passes over the network. That is, since the biometric information does not pass through a network, it can be said that the risk of leakage of the information is low.

In addition, differently from ID/password authentication, one of an authentication system adopting the biometric authentication is a system that is able to register a plurality of pieces of biometric information such as a thumb, an index finger, and a middle finger. Japanese Patent Laid-Open No. 2005-268951 discloses a mobile phone which registers a fingerprint of a plurality of fingers, and correspondence relationships between a fingerprint of each finger and a specific function, and in a case where a fingerprint recognized at a time of authentication matches with any of the plurality of registered fingerprint data, a function corresponding to a matched fingerprint is executed.

For example, there is a pull print system that disposes a device such as multifunction peripheral (MFP) in an office or a convenience store and prints data in the print server. In order to execute a print process using the pull printing system, it is necessary to (1) perform authentication with the print server, (2) to perform print setting such as selection of documents to be printed, number of prints, or a darkness, and (3) to press an execution button.

The setting such as step (2) is often a routine operation, and it is inefficient for the user to perform the same operation each time a printing process is executed. In addition, also in the a case of using a web service that requires communication with a server from a device such as a PC or a smartphone as well as the pull print system, it is inefficient for the user to perform the same operation each time a routine operation is performed in the web service, similarly.

However, the technique of Japanese Patent Laid-Open No. 2005-268951 is for using the function in the device, and a case where a web service described above is used is not considered. For example, in a case where a web service is used, it is necessary for the server providing the service to authenticate the user, and it is impossible to immediately execute the function of the web service using only authentication in the device.

SUMMARY OF THE INVENTION

The present invention provides a system for improving operability when a web service is used.

A system of an exemplary embodiment of the present invention includes an information processing apparatus including an authentication module for biometric authentication, a storage unit having tamper resistance for storing biometric information of a user necessary for performing an authentication process by the authentication module and a secret key created when the biometric information is registered, a biometric information sensor for reading the biometric information of the user, and a display, and a server for managing a public key corresponding to the secret key, that is able to be connected to the information processing apparatus through a network. The information processing apparatus includes a registration unit configured to store a plurality of different pieces of biometric information of the user and a plurality of secret keys respectively corresponding to the pieces of biometric information in the storage unit to register the public keys corresponding to the plurality of secret keys in the server, an authentication unit configured to execute a biometric authentication process by the authentication module using the biometric information input from the user through the biometric information sensor and the biometric information registered in the storage unit in a case where an authentication request is received from the server, a creation unit configured to create signature data using the secret key corresponding to the biometric information used in the biometric authentication process registered in the storage unit and a parameter included in the authentication request in a case where the authentication is successful in the biometric authentication process, and a transmission unit configured to transmit the created signature data to the server. The server includes a verification unit configured to perform verification of the signature data transmitted from the information processing apparatus based on the authentication request using the public key managed by the server. The information processing apparatus further includes a display unit configured to perform display related to execution of a process associated with the biometric information corresponding to the secret key used when the signature data that is a target of the verification is created on the display in a case where the verification by the server is successful.

Further feature of the present invention will become apparent from the following description of exemplary embodiments with reference to the attached drawings.

DESCRIPTION OF THE EMBODIMENTS

Hereinafter, an exemplary embodiment of the present invention will be described with reference to the drawings and so on.

In addition, the present invention relates to a mechanism in which a service on a web performs biometric authentication on an information processing apparatus in a hand of a user in order to authenticate the user, and the service authenticates the user based on the result. This is able to be realized by registering information associated with biometric authentication by the information processing apparatus in the hand of the user, for example, authentication identification information, a public key, and the like in the service on the web, in advance. Although the FIDO is described as an example of such a mechanism, it should be noted in advance that the present invention is not limited to the FIDO.

First Exemplary Embodiment

System Configuration

Figure 1:
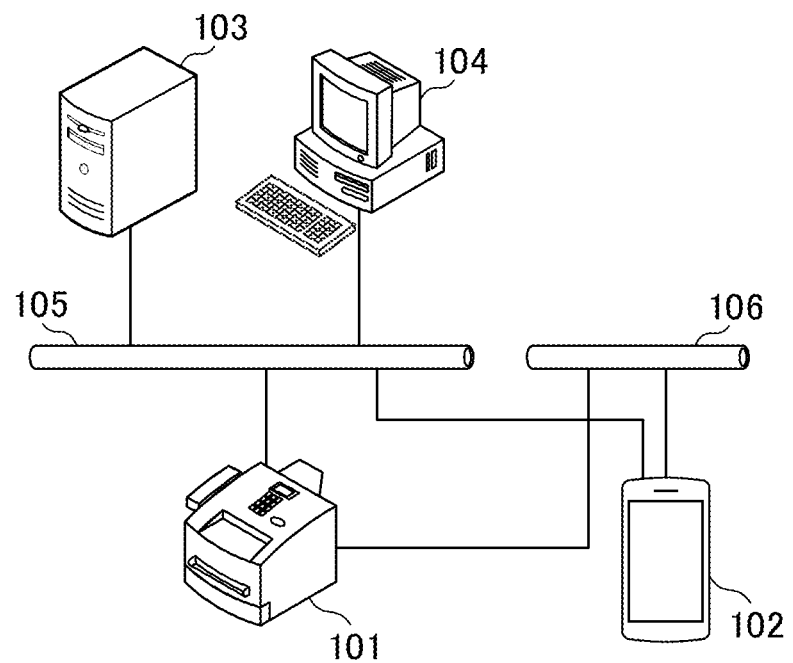
FIG. 1 is a diagram illustrating a network configuration of a system.

FIG. 1 is a diagram illustrating a network configuration example of the present system.

The present system includes an MFP 101, a portable terminal 102, a server 103, and a client PC 104.

The server 103 is able to be connected with an information processing apparatus such as the MFP 101, the portable terminal 102, or the client PC 104, through a network 105 or 106, and is an external system that provides a service to each of such devices. The server 103 includes a web server that receives various requests from the MFP 101, the portable terminal 102, or the client PC 104, and may be configured of one server apparatus or a plurality of apparatuses. In addition, a part or all of the servers 103 may be constructed using resources such as a virtual machine and a storage.

In the present exemplary embodiment, a print service is described as an example of the service provided by the server 103. The print service provides a cloud print service which stores various pieces of data such as document data or image data received through the network 105 or 106, and provides the stored data to the MFP 101 connected with the network 105 or 106 to print the stored data. In addition, in the present exemplary embodiment, the MFP 101 is an example of the information processing apparatus that performs biometric authentication in the hand of the user. Note that the present invention is not limited to the MFP 101, and may be applied to another information processing apparatus, for example, the portable terminal 102 or the client PC 104.

The MFP 101, the portable terminal 102, the server 103, and the client PC 104 are connected with each other through the network 105. The network 105 is, for example, a LAN, a WAN or other type of Internet communication network, a telephone line, a dedicated digital line, a line using ATM or frame relay, a cable television line, a data broadcasting radio line, or the like. The network 105 may be a so-called communication network realized by a combination of these. The network 105 may transmit and receive data.

The MFP 101 and the mobile terminal 102 are connected to each other through the network 106. As the network 106, for example, s proximity communication such as near field communication (NFC) or BlueTooth (registered trademark) in addition to the above-described network line such as a LAN can be used.

<Hardware Configuration of Server and PC>

Figure 2:
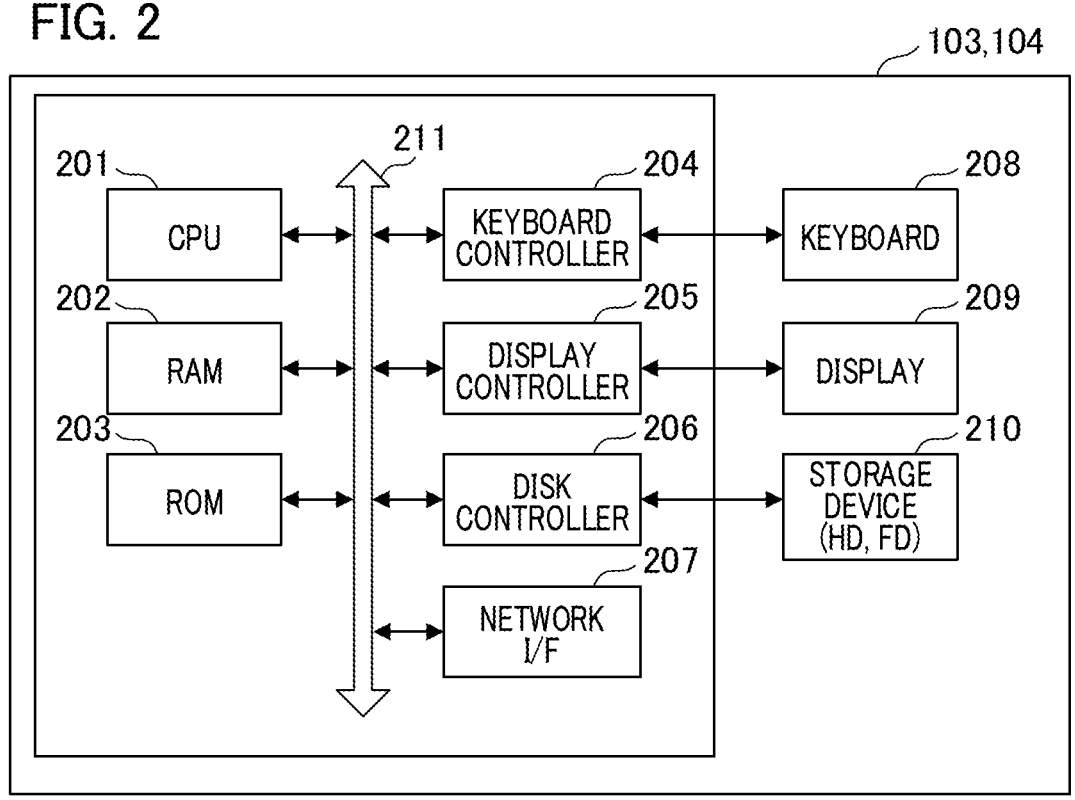
FIG. 2 is a diagram illustrating an example of a hardware configuration of a server and a PC.

FIG. 2 is a diagram illustrating an example of the hardware configuration of the server 103 and the client PC 104.

A CPU 201 executes programs stored in a ROM 203 and a storage device 210 using a RAM 202 as a work memory, and comprehensively controls various configurations that will be described later through an internal bus 211. A keyboard controller 204 controls operations input from a keyboard 208 or a pointing device (a mouse, a touch pad, a touch panel, a track ball, or the like) (not shown).

A display controller 205 controls displaying of the display 209. A disk controller 206 controls data accessing to the storage device 210 such as a hard disk (HD) or a flexible disk (FD) that stores various pieces of data. A network interface 207 is connected to a network such as a LAN and controls communication with other devices connected to the network. Each of units 201 to 207 configuring the hardware is connected to each other through the internal bus 211.

<Hardware Configuration of MFP>

Figure 3:
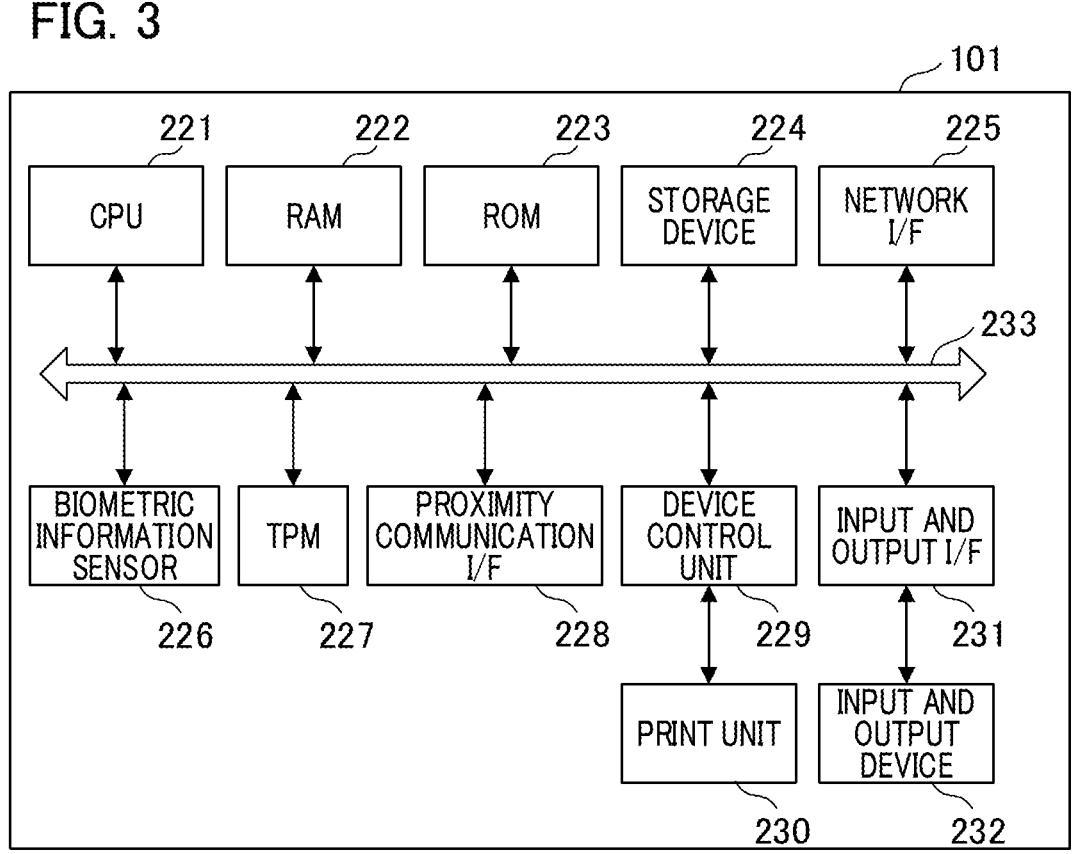
FIG. 3 is a diagram illustrating an example of a hardware configuration of an image forming apparatus.

FIG. 3 is a diagram illustrating an example of the hardware configuration of the MFP 101. The MFP 101 is an example of an image forming apparatus. The image forming apparatus is not limited to the MFP 101, and may be, for example, a laser beam printer, an ink jet printer, or the like. A CPU 221 executes programs stored in a ROM 223 and a storage device 224 using a RAM 222 as a work memory, and comprehensively controls each configuration that will be described later through an internal bus 233.

The RAM 222 is a main memory of the CPU 221 and functions as a work area or the like. The storage device 224 stores various pieces of data. Programs for realizing each process that will be described later is stored in the ROM 223 or the storage device 224, for example. A network I/F 225 exchanges data in a unidirectional manner or a bidirectional manner with other information processing apparatuses. A biometric information sensor 226 is a sensor for reading biometric information of the user, and reads and converts the biometric information such as a fingerprint, an iris, a vein, a voice print, and a face image of the user into a signal. Note that the biometric information is not limited to these.

A trusted platform module (TPM) 227 is a storage unit having tamper resistance to prevent the stored data from being read from the outside for the purpose of processing and storing confidential information. The TPM 227 has a function of storing the biometric information input from the biometric information sensor 226 or the secret key generated in the MFP 101 and verifying the stored biometric information and the input biometric information. Note that the portable terminal 102 or the client PC 104 may have the TPM 227.

A proximity communication I/F 228 is a network I/F corresponding to a communication system for proximity communication such as NFC or BlueTooth (registered trademark), and communicates with the portable terminal 102 and the like to exchange data. For example, it is also possible to perform a print instruction from the portable terminal 102 or the like to the MFP 101. A device control unit 229 controls a print unit 230 provided in the MFP 101 to print on actual paper using a printing technique such as an electrophotography technique or an ink jet technique.

The input and output I/F 231 controls a plurality of input and output devices 232 provided in the MFP 101. Specifically, the input and output I/F 231 receives an input from the input and output device 232 such as a button or a touch panel, and transmits a signal corresponding to the input to each processing unit. In addition, the input and output I/F 231 controls displaying on a display device (a display) such as a liquid crystal display or a touch panel. In addition, the MFP 101 may include a scanner as the input and output device 232. The scanner reads and converts a paper original or a photograph to electronic data. In this case, the input and output I/F 231 controls the scanner.

<Hardware Configuration of Portable Terminal>

Figure 4:
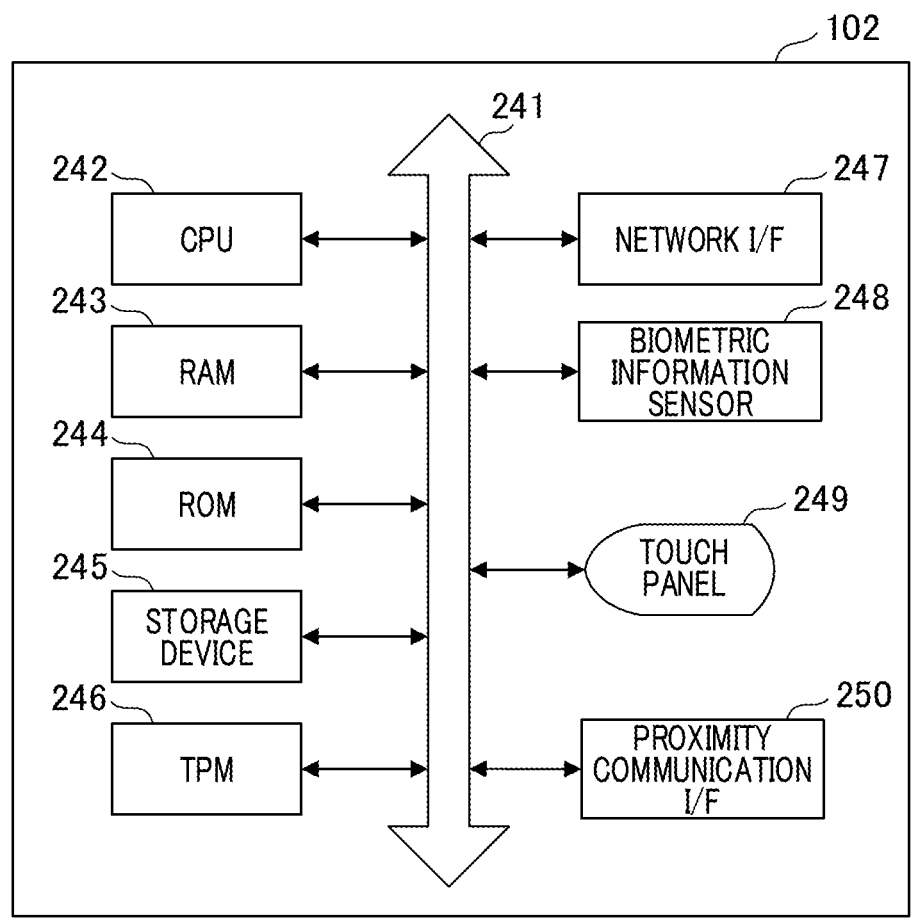
FIG. 4 is a diagram illustrating an example of a hardware configuration of a portable terminal.

FIG. 4 is a diagram illustrating an example of the hardware configuration of the portable terminal 102.

The portable terminal 102 further includes a wireless communication function in addition to basic hardware configuring the server 103 or the client PC 104. An internal bus 241, a CPU 242, a RAM 243, and a ROM 244 have functions similar to those of the internal bus 211, the CPU 201, the RAM 202, and the ROM 203 shown in FIG. 2.

A storage device 245 is a storage device such as a solid state drive (SSD) or an SD memory card, and stores various pieces of data similarly to the storage device 210. A TPM 246 has a function similar to that of the TPM 227 shown in FIG. 3. A network I/F 247 has a wireless communication function in addition to a function to control communication with other information processing apparatuses connected to the network. A biometric information sensor 248 has a function similar to that of the biometric information sensor 226 shown in FIG. 3.

A touch panel 249 is a device having both of a display function and a pointing function, and the user is able to operate an object displayed on the display with a finger, a touch pen, or the like. Note that the touch panel 249 may be a touch panel in which a part or the entire surface is a biometric information sensor of a fingerprint, a vein, or the like. In this case, the touch panel 249 is provided with the biometric information sensor 248. A proximity communication I/F 250 has a function similar to that of the proximity communication I/F 228 shown in FIG. 3.

<Software configuration of portable terminal and client PC>

Figure 5A:
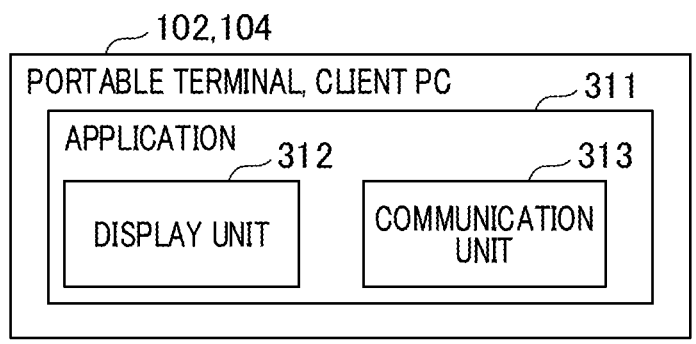
FIGS. 5A to 5C are diagrams illustrating examples of software configurations of each device.

FIG. 5A is a diagram illustrating an example of the software configuration of the portable terminal 102 and the client PC 104 used in the present invention.

An application 311 is an application for providing a print service to a user in cooperation with the server 103.

Specifically, a function of acquiring a service, for example, print data from an MFP service 341 of the server 103 and transmitting the print data to the MFP 101 to execute printing may be provided by using the application 311. In addition, for example, a function of registering authentication information for the user to access the print service in the MFP service 341 may be provided. In addition, for example, a function of allowing the MFP service 341 to authenticate the user and allowing the user to browse individual web pages through the application 311 may be provided.

The application 311 includes a display unit (UI) 312 and a communication unit 313. The application 311 is a web browser, a native application installed in the portable terminal 102 for performing document creation and/or image browsing, or the like. The user operates the display unit 312 and the communication unit 313 communicates with the server 103, thereby providing the above-described various services to the user.

<Software configuration of MFP>

Figure 5B:
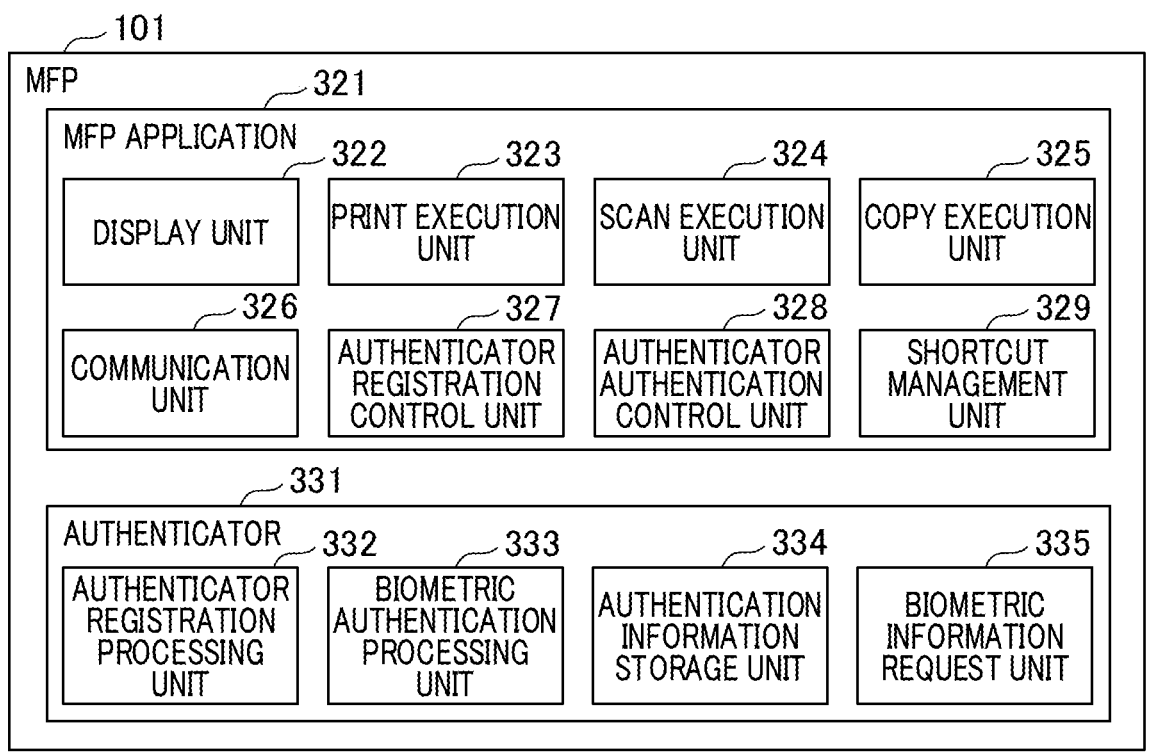

FIG. 5B is a diagram illustrating an example of the software configuration of the MFP 101 used in the present invention.

The MFP 101 includes an MFP application 321 and an authenticator (an authentication module) 331.

The MFP application 321 is an application installed in the MFP 101 and provides a function such as printing, scanning, copying, or the like. The MFP application 321 may be implemented separately for each function, or may be implemented by integrating a plurality of functions. A display unit 322 provides a user interface (UI) to the user through the touch panel that is the input and output device 232.

A print execution unit 323 executes printing of print data. A scan execution unit 324 reads and converts a paper original, a photograph, or the like to electric data using a scanner that is the input and output device 232. A copy execution unit 325 reads a paper original, a photograph, or the like using the scanner, and outputs the result of copying using the print unit 230. A communication unit 326 communicates with another information processing apparatus such as the server 103 connected to the network through the network I/F 225.

An authenticator registration control unit 327 requests an authenticator 331 to create a credential that will be described later. In addition, when registering the authenticator 331 in the MFP service 341, the authenticator registration control unit 327 generates various requests to be transmitted to the MFP service 341.

Note that in the present exemplary embodiment, the authenticator registration control unit 327 is included in the MFP application 321, but the present invention is not limited thereto. For example, the authenticator registration control unit 327 may be configured independently from the MFP application 321, and the MFP application 321 may call the independent authenticator registration control unit 327.

In addition, the authenticator registration control unit 327 may be installed in the OS as standard. In the case the authenticator registration control unit 327 is independent from the MFP application 321, it is possible to have a configuration such that not only the MFP application 321 but also other applications are able to call the authenticator registration control unit 327.

An authenticator authentication control unit 328 makes a request for an authentication process to the authenticator 331 and generates a request to be transmitted to the MFP service 341 at a time of authentication. A specific process performed by the authenticator authentication control unit 328 will be described later. Note that the authenticator authentication control unit 328 may also be configured independently from the MFP application 321 similar to the authenticator registration control unit 327.

A shortcut management unit 329 manages association between the biometric information and the operation. In the present exemplary embodiment, a predetermined operation is registered in advance in association with the biometric information, and thus the operation is able to be executed immediately after the authentication. The registered operation is referred to as a shortcut operation. A specific process performed by the shortcut management unit 329 will be described later.

The authenticator 331 is the authentication module for biometric authentication using the biometric information read by the biometric information sensor 226. An authenticator registration processing unit 332 receives a creation request of the credential from the authenticator registration control unit 327 or the like of the MFP application 321, and creates a pair of keys (a secret key and a public key) and creates the credential.

A biometric authentication processing unit 333 receives a biometric authentication request from, for example, the authenticator authentication control unit 328 of the MFP application 321 and performs the biometric authentication using the biometric information read by the biometric information sensor 226. An authentication information storage unit 334 stores authentication information and the like in the TPM 227. The authentication information is, for example, information shown in Table A or Table B that will be described later. A biometric information request unit 335 provides the user with a UI for receiving the input of the biometric information through the input and output device 232 such as a touch panel.

<Example of Table Managed by MFP 101>

TABLE A

Authentication information management table

| Authentication ID | Service ID | User ID | Secret key | Biometric information ID |
|---|---|---|---|---|
| 407c-8841-79d | mfpservice.com | user001 | 1faea2da-a269-4fa7-812a-509470b9a0cb | d493a744 |
| 4c04-428b-a7a2 | mfpservice.com | user001 | d7ae30c8-3775-4706-8597-aaf681bc30f5 | dcc97daa |
| 92b2-498d-bea6 | mfpservice.com | user001 | 36ae5eed-732b-4b05-aa7b-4dddbe3267 | 51caacaa |
| ... | ... | ... | ... | ... |

In the authentication information management table of Table A, one record indicates one entry of the authentication information. The record of Table A is created when the authenticator 331 is registered in the service such as the MFP service 341 and added to the table A. In an authentication information ID column, an ID for uniquely identifying each piece of authentication information is stored in each piece of the authentication information.

A service ID column stores an ID for uniquely identifying a service that is a target of the registration of the authenticator such as the MFP service 341. In the present exemplary embodiment, a service domain name is used as a service ID. In Table A, a domain name of the MFP service 341 is stored as the service ID. A user ID column stores an ID for uniquely identifying the user by the MFP service 341 used for legacy authentication and the like. Note that in the present exemplary embodiment, authentication verifying coincidence of a user ID and a password is described as legacy authentication in order to distinguish the authentication from the biometric authentication.

A secret key column stores an identifier of the secret key of the pair of keys created by the authenticator registration processing unit 332. The public key corresponding to (i.e. paired with) the secret key is registered in a service indicated in the service ID column. A biometric information ID column stores an ID corresponding to a feature value of the biometric information. A procedure of storing the information corresponding to each column of the authentication information management table and a procedure of transmitting and storing the public key in the MFP service 341 will be described later.

TABLE B

Shortcut management table

| Authentication information ID | Service ID | Biometric information | Operation |
|---|---|---|---|
| 407c-8841-79d | mfpservice.com | Right hand thumb | {"disp": "to home screen", "func": null, "param": null } |
| 4c04-428b-a7a2 | mfpservice.com | Right hand index finger | {"disp": "all print", "func": "print", "param": {"color": "auto", "print_target": "all" }, ...} |
| 92b2-498d-bea6 | mfpservice.com | Right hand middle finger | {"disp": "scan and transmit", "func": "scan", "param": {"color": "auto", "dist": user001@xxx.com}, ... } |
| ... | ... | ... | ... |

The shortcut management table in Table B is a table necessary for realizing registration and execution of a shortcut operation by the biometric authentication. One record indicates a combination of the biometric information and a shortcut operation associated with the biometric information. A record of Table B is created when registering the shortcut operation by the biometric authentication and added to Table B. Each column of an authentication information ID and a service ID are similar to those of each column of Table A.

A biometric information column stores registration name indicating a type of the biometric information to be registered in association with the shortcut operation, when a registration process of the authenticator 331 is performed. This registration name may be determined by the MFP application 321 in advance or may be customized by the user. In addition, Table B names the registration name using an example of a case where a fingerprint is used as the registration name of the biometric information, but the registration name is not limited thereto. Information related to the operation associated with the biometric information is stored in an operation column. A procedure related to registration and execution of the shortcut operation will be described later.

<Software Configuration of Server>

Figure 5C:
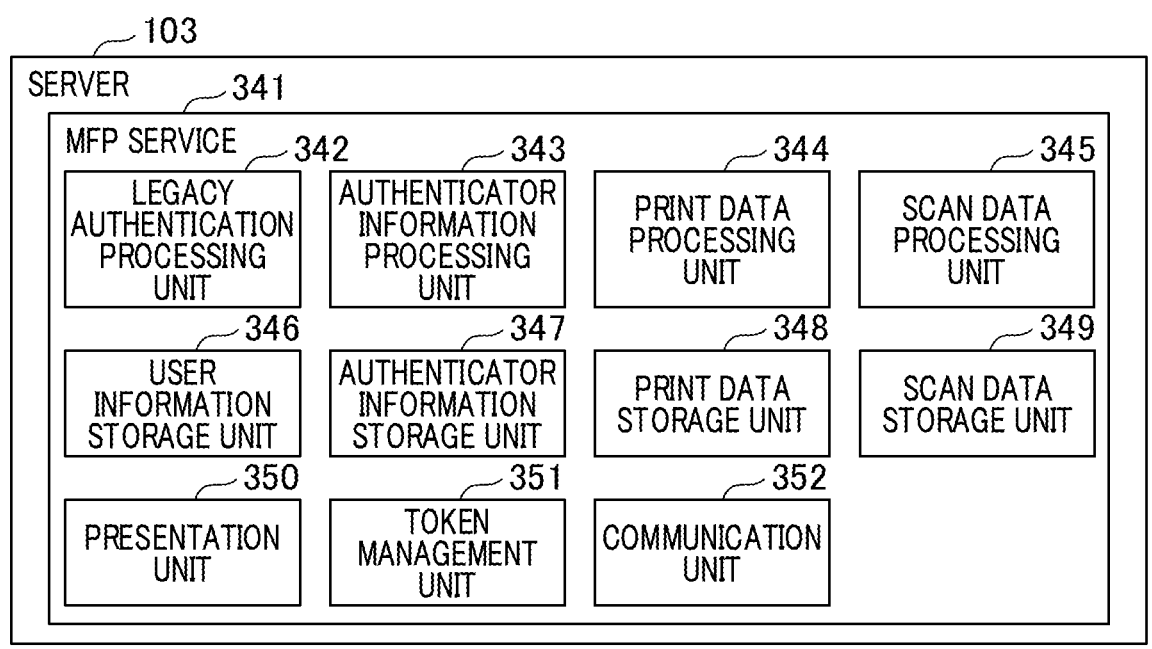

FIG. 5C is a diagram illustrating an example of the software configuration of the server 103.

The MFP service 341 is a web service that provides a print service such as pull printing and scan transmission using a communication protocol such as HTTP. The MFP service 341 is realized by the CPU 201 reading a program stored in the ROM 203 to the RAM 202 and executing the program.

A legacy authentication processing unit 342 is a software module that verifies whether the user ID and the password included in a legacy authentication request received by the communication unit 352 coincides with the user ID and the password stored in a user information storage unit 346. Note that in the present exemplary embodiment, the authentication verifying the coincidence of the user ID and the password is described as legacy authentication in order to distinguish the legacy authentication from the biometric authentication.

An authenticator information processing unit 343 is a software module that stores information related to the authenticator 331 in the authenticator information storage unit 347 using the credential received by the communication unit 352. In addition, the authenticator information processing unit 343 verifies assertion information, that will be described later, received by the communication unit 352.

A print data processing unit 344 is a software module that executes a process according to various requests received by the communication unit 352. For example, the print data processing unit 344 registers the print data in a print data storage unit 348 in response to a registration request of the print data received by the communication unit 352. In addition, for example, the print data processing unit 344 acquires the print data from the print data storage unit 348 in response to a print data acquisition request received by the communication unit 352.

A scan data processing unit 345 is a software module that transmits scan data received by the communication unit 352 to the outside through a mail server or the like or registers the scan data in a scan data storage unit 349. The user information storage unit 346 is a software module that stores the user information, that will be described later using Table C, in the storage device 224 or an external storage system (not shown).

An authenticator information storage unit 347 is a software module that stores information related to the authenticator 331, that is authenticator information described later using Table E, in the storage device 224 or the external storage system. A print data storage unit 348 is a software module that stores the print data transmitted from the portable terminal 102 or the client PC 104 in the storage device 224 or the external storage system.

A scan data storage unit 349 is a software module that stores the scan data scanned by the MFP 101 and received by the communication unit 352 in the storage device 224 or the external storage system. Note that the scan data scanned by the MFP 101 may be stored in the server 103, may be stored in the MFP 101, or may be stored in both of the server 103 and the MFP 101.

A presentation unit 350 is a software module that creates HTML, CSS, JavaScript (registered trademark), or the like in response to an acquisition request or the like of a screen for registering the authenticator received by the communication unit 352. A token management unit 351 is a software module that issues and verifies a token that will be described later using Table F. The communication unit 352 is a software module that communicates with an external crisis of the MFP 101, the mobile terminal 102, the client PC 104, or the like through the network I/F 225.

<Example of Table Managed by Server 103>

TABLE C

User information management table

| User ID | Password | Mail address |
| --- | --- | --- |
| user001 | ****** | user001@xxx.co.jp |
| user002 | ****** | user002@xxx.co.jp |
| ... | ... | ... |

The user information management table of Table C is a table management by the user information storage unit 346 of the MFP service 341. In the user information management table, one record indicates one piece of user information. A user ID column stores an ID for uniquely identifying the user of the MFP service 341. A password column stores a password for authenticating the user. This password is a password used in the legacy authentication. A mail address column stores a mail address of the user. Note that the user information management table may store attribute information of the user such as an address of the user in addition to the mail address.

TABLE D

Attestation challenge management table

| Attestation challenge | User ID | Expiration date |
| --- | --- | --- |
| 65C9B063-9C33 | user001 | 2017-05-02T12:00:34Z |
| 7317EFBA-4E63 | user002 | 2017-05-02T12:03:12Z |
| ... | ... | ... |

The attestation challenge management table of Table D is a table managed by the user information storage unit 346 of the MFP service 341. In the attestation challenge management table, one record indicates one piece of information of attestation challenge. The attestation challenge is a parameter used as verification data for challenge response authentication and is issued for each user.

A process of issuing the attestation challenge will be described later. An attestation challenge column stores a value of the attestation challenge. A user ID column stores a user ID of a user who issued the attestation challenge. An expiration date column stores an expiration date of the attestation challenge.

TABLE E

Authenticator information management table

| Authentication information ID | Public key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-948F-BFCE66A74310 | user001 |
| ... | ... | ... |

The authenticator information management table of Table E is a table managed by the authenticator information storage unit 347 of the MFP service 341. In the authenticator information management table, one record indicates one piece of authenticator information. In a case where the authenticator 331 is registered, a record is added to the authenticator information management table. An authentication information ID column stores a value of the authentication information ID column of the authentication information managed in the authentication information management table (i.e. Table A) by the registered authenticator 331.

A public key column stores the public key corresponding to (i.e. paired with) the secret key created by the authenticator 331 and managed by the authentication information management table (i.e. Table A). That is, data encrypted by the secret key of Table A is able to be decrypted by the public key in Table E if the secret key and the public key have the same value of the authentication information ID in the authentication information management table (Table A) and the authenticator information management table (Table E).

A user ID column stores an ID for uniquely identifying the user by the MFP service 341.

TABLE F

Token management table

| Token | User ID | Expiration date |
|---|---|---|
| 3FD4FA-AA4-56DC-B45F-45BCD65AC45D | user001 | 2017-05-02T13:14:31Z |
| EC51DC-36C4-4BC3-54CF-31ECE6CACBF0 | user002 | 2017-05-02T13:31:32Z |
| ... | ... | ... |

The token management table of Table F is a table managed by the token management unit 351 of the MFP service 341. In the present exemplary embodiment, the token is issued by the token management unit 351 of the MFP service 341 as a result of success of various authentication processes by the legacy authentication, the biometric authentication, or the like. When the MFP service 341 is used, the MFP application 321 is able to use the service provided by the MFP service 341 by giving the issued token and transmitting the request.

In the token management table, one record indicates one piece of information of a token. The token is stored in a token column. A user ID column stores an ID for uniquely identifying the user of the MFP service 341. An expiration date column stores an expiration date of the token. The MFP service 341 accepts a request in a case where the token given to the request from the user is present in the token column of the token management table and does not pass the expiration date of the expiration date column.

<Authenticator Registration Processing>

Next, the process of registering the authenticator 331 of the device will be described with reference to FIGS. 6 to 8G.

Hereinafter, a case where the device is the MFP 101 will be described, but the same is also applied to a case where the device is the portable terminal 102 or the client PC 104.

Note that registering the information of the authenticator 331 in the MFP service 341 is simply referred to as registration of an authenticator. In addition, in the present exemplary embodiment, the registration of the authenticator is performed when the shortcut operation is registered. Registration of an ordinary authenticator that is not associated with any operation for starting the use of the service has already been registered or is able to be replaced with the legacy authentication in the present exemplary embodiment.

Figure 6:
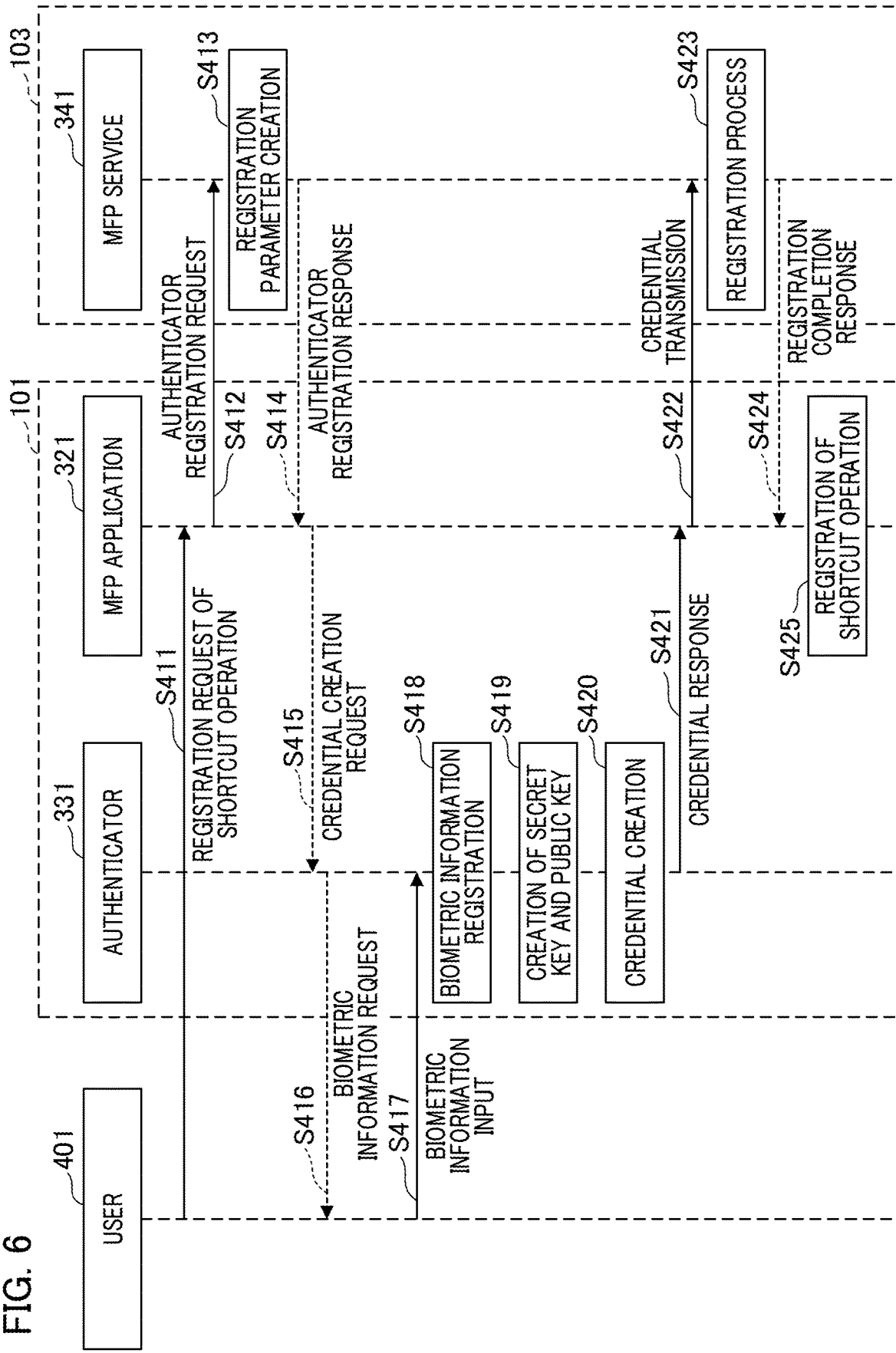
FIG. 6 is a diagram illustrating a sequence of a process of registering an authenticator in a service.
Figure 7A:
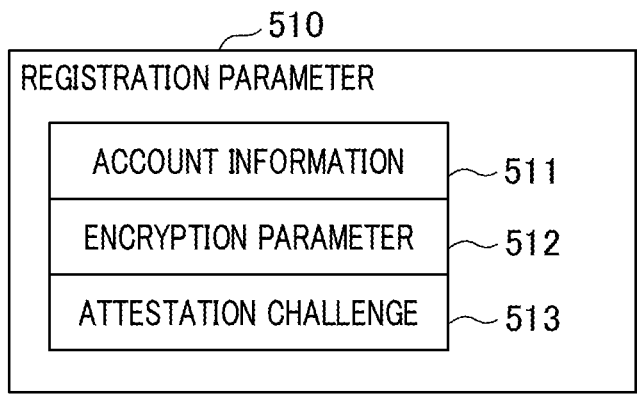
FIGS. 7A to 7C are diagrams illustrating an example of a parameter used when an authenticator is registered.
Figure 7B:
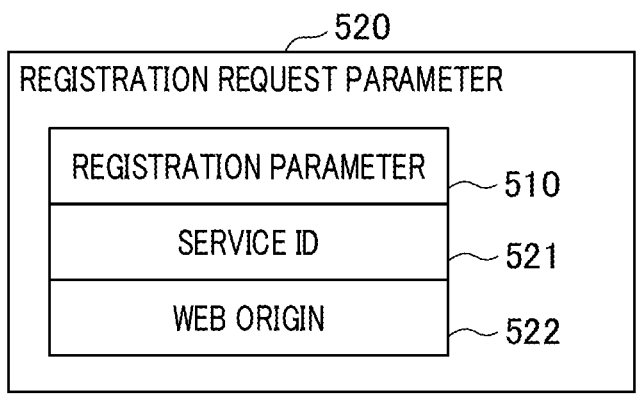
Figure 7C:
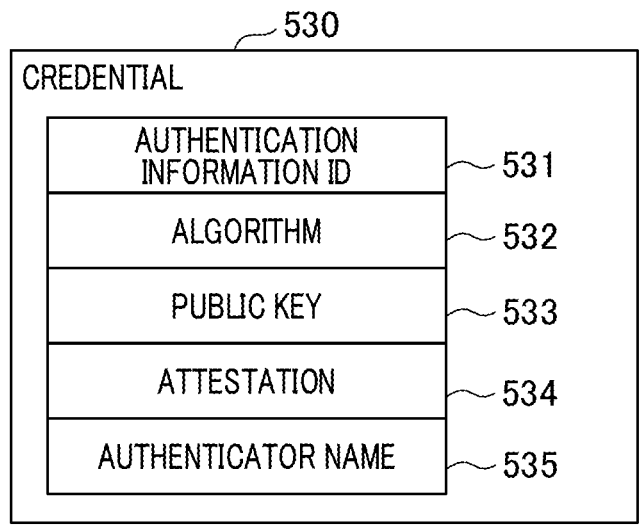

FIG. 6 is a diagram illustrating a process sequence until the authenticator 331 is registered in the MFP service 341. In addition, FIGS. 7A to 7C are diagrams illustrating an example of a parameter included in the communication between the MFP 101 and the server 103 in the registration process of the authenticator 331. In addition, FIGS. 8A to 8G are diagrams illustrating an example of a user interface (UI) displayed by the display unit 322 of the MFP application 321 in the registration process of the authenticator 331.

First, in step S411 of FIG. 6, a user 401 of the MFP 101 requests the MFP application 321 to register the shortcut operation to the MFP service 341 of the server 103. FIGS. 8A to 8E are diagrams illustrating an example of a UI until the registration request for the shortcut operation is performed in step S411.

Figure 8A:
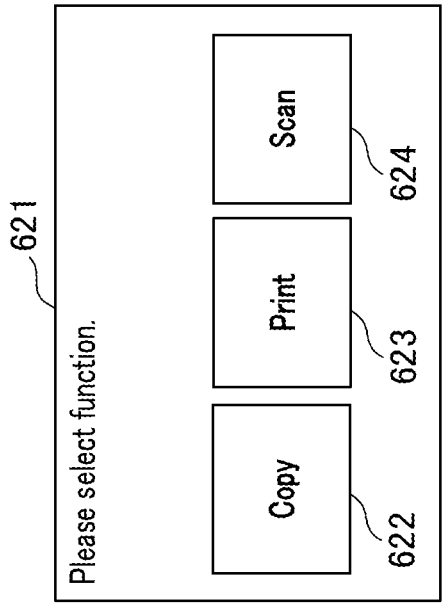
FIGS. 8A to 8G are diagrams illustrating an example of a UI displayed when the authenticator is registered.

A screen 611 of FIG. 8A is an authentication screen. A button 612 is a button for reading the biometric information such as a fingerprint and so includes the biometric information sensor 226. The user 401 performs the authentication by pressing a fingerprint on the button 612. Note that in the screen 611, a case where the fingerprint authentication is used as an authentication method has been described as an example, but, the authentication method used in the registration of the authenticator 331 is not limited to the fingerprint authentication.

For example, in a case where no fingerprint is registered, it is also possible to perform the authentication by the legacy authentication. In addition, for example, at a time of starting the use of the service, it is also possible to execute the registration of the authenticator by using the biometric information that is not associated with any operation with respect to the MFP service 341 and perform the authentication by the biometric authentication using the biometric information.

Figure 8B:
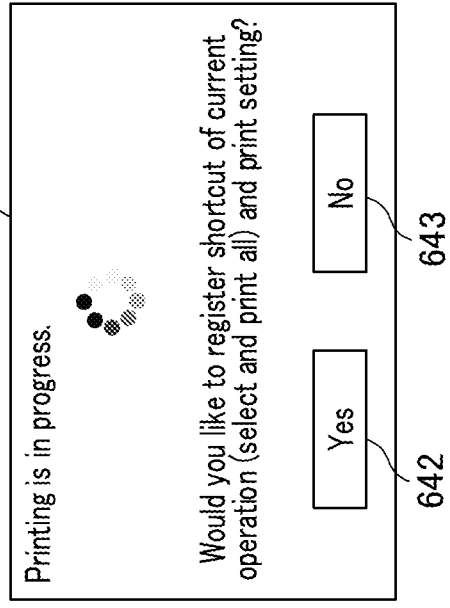

A screen 621 of FIG. 8B is a screen for selecting a function of the MFP 101. In a case where a button 622 is pressed, the screen transits to a setting screen for executing copying. In a case where a button 623 is pressed, the screen transits to a setting screen for executing printing. In a case where a button 624 is pressed, the screen transits to a setting screen for executing scanning. Here, a case where the button 623 is pressed will be described.

Figure 8C:
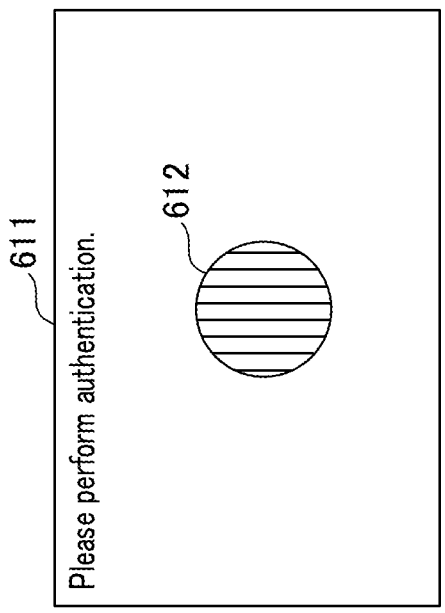

A screen 631 of FIG. 8C is the setting screen for executing printing displayed in a case where the button 623 is pressed. In a selection field 632, a list of the print data that is able to be printed by the user 401 authenticated on the screen 611 of FIG. 8A is displayed. The list of the print data is acquired from the print data storage unit 348 of the MFP service 341. The user 401 selects the print data to be printed with a check box in the selection field 632.

Figure 8D:
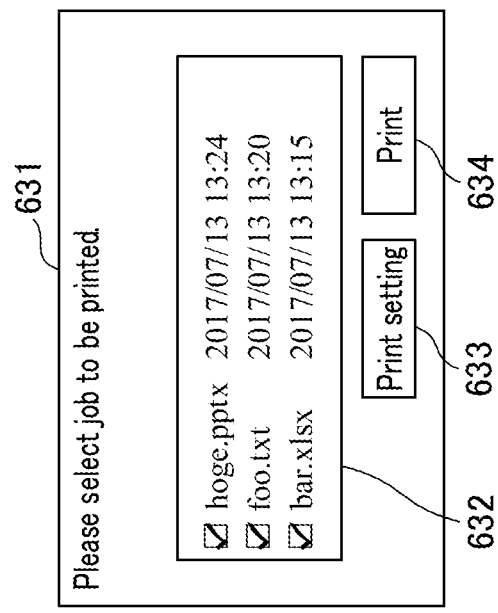

In a case where the button 633 is pressed, the screen transits to a setting screen for performing a detailed setting relating to printing, and a parameter such as the number of sheets and the darkness is able to be set. In a case where a button 634 is pressed, printing is executed. A screen 641 of FIG. 8D is a screen for asking the user whether to perform the registration request of the shortcut operation. In a case where the button 634 is pressed and printing is executed, the screen transits to the screen 641.

Note that in the example shown in FIG. 8D, the screen 641 displays for inquiring whether or not to perform the registration request of the shortcut operation and also displays that printing is being executed. Here, a parameter such as the operation selected on the screen 621 or the screen 631 or the print setting (not shown) displayed by the press of the button 633 is stored.

Figure 8E:
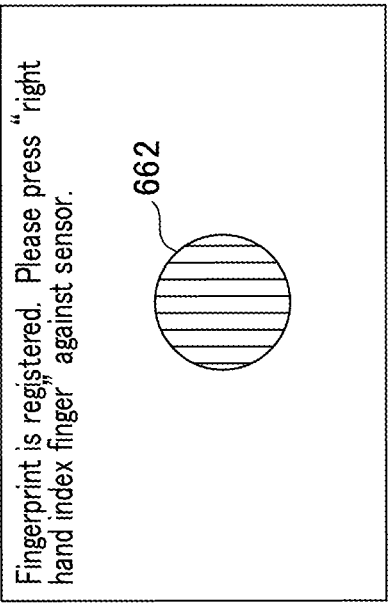

In order to use the operation and the parameter in the future, in a case where the operation and the parameter are registered in association with the biometric information as the shortcut operation, the button 642 is pressed. In addition, in a case where the operation and the parameter are not registered as the shortcut operation, the button 643 is pressed. In a case where the button 642 is pressed, a screen 651 shown in FIG. 8E is displayed while taking over the operation and the parameter. On the other hand, in a case where the button 643 is pressed, the process is ended without performing the registration of the shortcut operation, and the screen transits to another screen such as a home screen.

The screen 651 of FIG. 8E is a screen for performing the registration of the shortcut operation. The type of the biometric information to be registered in association with the operation and the parameter taken over from the screen 621 and screen 631 is selected on the screen 651. A combination of a currently registered shortcut operation and the biometric information associated with the shortcut operation is displayed in a list 652. In addition, fingerprint information associated with the operation registered as the shortcut operation and the parameter is selected in the list 652.

Figure 8F:
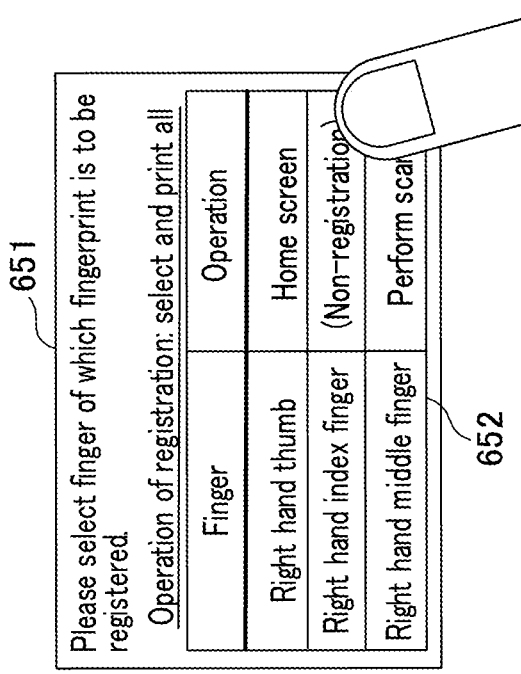

In a case where the type (a row) of the fingerprint information associated with the operation and the parameter is selected, the registration request of the shortcut operation is transmitted to the server 103 (step S411) and the screen transits to a screen 661 of FIG. 8F. In the example shown in FIG. 6E, it is assumed that a row of "right index finger" of which a shortcut operation has not been registered is selected.

Note that FIGS. 8A to 8E described above are an example of the UI for performing the registration request of the shortcut operation, and the procedure until the shortcut operation is performed and the UI are not limited thereto. For example, in the present exemplary embodiment, after performing an operation to actually perform printing, the registration request of the shortcut operation is performed by taking over the operation and the parameter. However, as described above, the operation and the parameter may be set so that the user registers the shortcut operation in advance without performing an actual operation of copying, printing, scanning, or the like.

The description is returned to the description of FIG. 6. In step S412, the authenticator registration control unit 327 of the MFP application 321 requests the MFP service 341 to register the authenticator 331. In the present exemplary embodiment, the registration of the authenticator 331 to the MFP service 341 is necessary according to the registration of the shortcut operation. In step S413, the authenticator information processing unit 343 of the MFP service 341 creates a registration parameter. The registration parameter is data used when the server 103 executes the registration process of the authenticator 331.

The authenticator 331 receives the registration parameter through the MFP application 321 and creates the credential using the data included in the registration parameter. In addition, the server 103 receives the credential through the MFP application 321 and verifies that the registration request from the MFP application 321 is not an illegal request based on the credential. Hereinafter, the registration parameter will be described.

FIG. 7A is a diagram illustrating an example of the registration parameter. The registration parameter 510 includes account information 511, an encryption parameter 512, and an attestation challenge 513. The account information 511 stores the attribute information of the user such as the user ID specified in the authentication of FIG. 8A by the MFP service 341, and the mail address associated with the user ID.

The encryption parameter 512 stores the attribute information related to the authentication information to be registered, such as an encryption algorithm supported by the MFP service 341. The attestation challenge 513 stores the verification data to be used for performing the challenge response authentication. The verification data, that is, the attestation challenge 513 is created when creating the registration parameter in step S413, and is stored in the attestation challenge management table (Table D) in association with the user ID, the expiration date, or the like.

Note that the registration parameter shown in FIG. 7A is an example, and the registration parameter is not limited thereto. For example, in addition to the example shown in FIG. 7A, the registration parameter 510 may have a region storing an extension parameter that is able to be specified by the MFP service 341 and being used by the MFP service 341 to control the operation of the authenticator 331 and the like as an extension region.

In step S414, the communication unit 452 of the MFP service 341 returns or responds to the registration parameter 510 created in step S413. Note that, in addition to the registration parameter 510, the data returned in step S414 includes, for example, a registration screen of the authenticator created by the presentation unit 350, various programs and data for displaying the registration screen, or the like.

In addition, the data returned in step S414 may include the token issued in the authentication of FIG. 8A. A screen 661 of FIG. 8F is an example of a registration screen. A button 662 is a button for reading the biometric information such as a fingerprint and includes the biometric information sensor 226.

In step S415, the authenticator registration control unit 327 of the MFP application 321 performs a creation request of the credential to the authenticator 331. The creation request is executed when the display unit 322 of the MFP application 321 reads the registration screen (FIG. 8F) of the authenticator. For example, the process of step S415 is executed in an onload event that occurs when the registration screen of the authenticator 331 is read. The creation request of the credential includes a registration request parameter. Hereinafter, the registration request parameter will be described.

FIG. 7B is a diagram illustrating an example of a registration request parameter 520. The registration request parameter 520 includes a registration parameter 510, a service ID 521, and a Web Origin 522. The registration parameter 510 is the registration parameter 510 received from the MFP service 341 in step S414.

The service ID 521 is the ID for uniquely identifying the service to be registered by the authenticator as described in Table A and Table B. The Web Origin 522 is a combination of a protocol, a host name and a port, and in the present exemplary embodiment, Origin of the MFP service 341 is stored.

The description is returned to the description of FIG. 6. In step S416, the biometric information request unit 335 of the authenticator 331 requests to the user 401 the biometric information used when executing the shortcut operation to be registered. At this time, the screen 611 shown in FIG. 8F is displayed. Note that in the screen 611, a fingerprint is requested as the biometric information, but the biometric information is not limited to the fingerprint. For example, information such as a vein, an iris, a voice print, a face image, or the like is able to be used as the biometric information, and the biometric information is not limited to any of the fingerprint, the vein, the iris, the voice print, the face image, or the like.

Here, the MFP 101 is configured to input any one of the biometric information or a combination of an arbitrary plurality of pieces of biometric information as the biometric information used in the biometric authentication. The button 612 on the screen 611 is a button for reading the biometric information such as a fingerprint, and includes the biometric information sensor 226. The user 401 inputs the biometric information through the biometric information sensor 226 by pressing the button 662 with a fingerprint.

In step S418, the authenticator registration processing unit 332 of the authenticator 331 creates the feature value of the read biometric information and the biometric information ID for uniquely identifying the biometric information. In step S419, the authenticator registration processing unit 332 creates the pair of the secret key and the public key. In addition, the authenticator registration processing unit 332 stores the following information in the authentication information management table (i.e. Table A) stored in the TPM 227 through the authentication information storage unit 334.

That is, the biometric information ID created in step S418 and the secret key among the key pair created in step S419 are stored as the authentication information in association with the service ID and the user ID of the registration request parameter 520 included in the creation request of the credential. In addition, an ID for uniquely identifying each piece of the authentication information is created and stored in the authentication information of the authentication information management table (Table A). In step S420, the authenticator registration processing unit 332 creates the credential. Hereinafter, the credential will be described.

FIG. 7C is a diagram illustrating an example of the credential. The credential 530 includes an authentication information ID 531, an algorithm 532, a public key 533, an attestation 534, and an authenticator name 535. The authentication information ID 531 is the authentication information ID stored in the authentication information management table (i.e. Table A) in step S419, and the public key 533 is the public key of the key pair created in step S419.

The algorithm 532 stores the algorithm used when the key pair is created in step S419. The attestation 534 is data obtained by encrypting the attestation challenge 513 included in the registration request parameter of the creation request of the credential using the secret key created in step S419. The authenticator name 535 is a name of the authenticator 331 and is created by the authenticator 331.

In step S421, the authenticator registration processing unit 332 transmits the credential 530 created in step S420 to the MFP application 321. In step S422, the communication unit 326 of the MFP application 321 transmits the credential 530 received in step S421 to the MFP service 341.

In step S423, the authenticator information processing unit 343 of the MFP service 341 performs the registration process of the authenticator using the received credential 530. Hereinafter, the process of registering the credential executed by the authenticator information processing unit 343 will be described.

The authenticator information processing unit 343 decrypts the attestation 534 included in the credential 530 by the public key 533 included in the same credential 530 and verifies that the request is not an illegal registration request. In addition, the authenticator information processing unit 343 specifies a record in which the value in the attestation challenge column is the same as a value obtained by decrypting the attestation 534 by the public key 533 from the attestation challenge management table (i.e. Table D).

In addition, the authenticator information processing unit 343 sets the user ID of the specified record as a user ID associated with the credential 530. In addition, the authenticator information processing unit 343 stores or registers the authentication information ID 531 and the public key 533 included in the credential 530 and the user ID associated with the credential 530 in the authenticator information management table (i.e. Table E).

In step S424, the authenticator information processing unit 343 notifies the MFP application 321 that the registration process of the authenticator 331 is normally completed through the communication unit 352. In step S425, upon receiving the notification that the registration process is completed from the MFP service 341, the display unit 322 of the MFP application 321 displays a screen indicating that the registration is completed to the user 401.

Figure 8G:
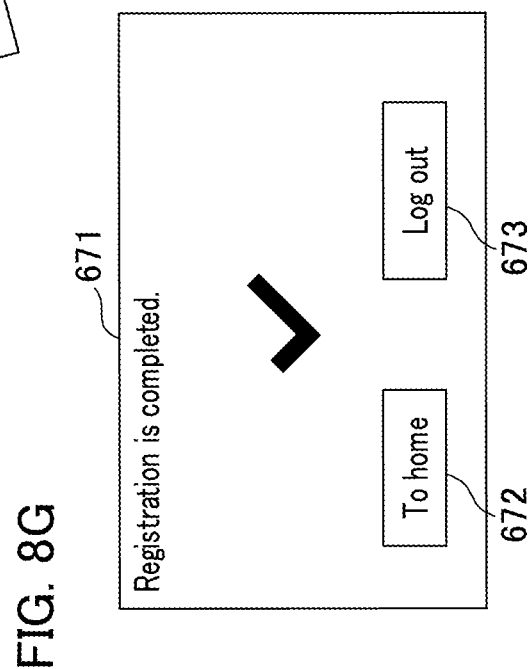

A screen 671 of FIG. 8G is an example of a screen indicating that the registration is completed. In a case where a button 672 is pressed, the screen transits to the screen 621 that is the home screen. In a case where a button 673 is pressed, the user logs out. In addition, in step S425, the shortcut management unit 329 of the MFP application 321 stores or registers the authentication information ID, the service ID, the shortcut operation, and the registration name of the biometric information in the shortcut management table (i.e. Table B) in association with each other.

<Execution of Authentication and Shortcut Operation>

A process in which the device executes the authentication and the registered shortcut operation will be described with reference to FIGS. 9 to 11C. Note that hereinafter, although a case where the device is the MFP 101 will be described, the same is applied to a case where the device is the portable terminal 102 or the client PC 104. In the present exemplary embodiment, when the MFP 101 uses the MFP service 341, in a case where the MFP 101 performs the biometrics authentication, the registered shortcut operation is able to be immediately executed.

Figure 9:
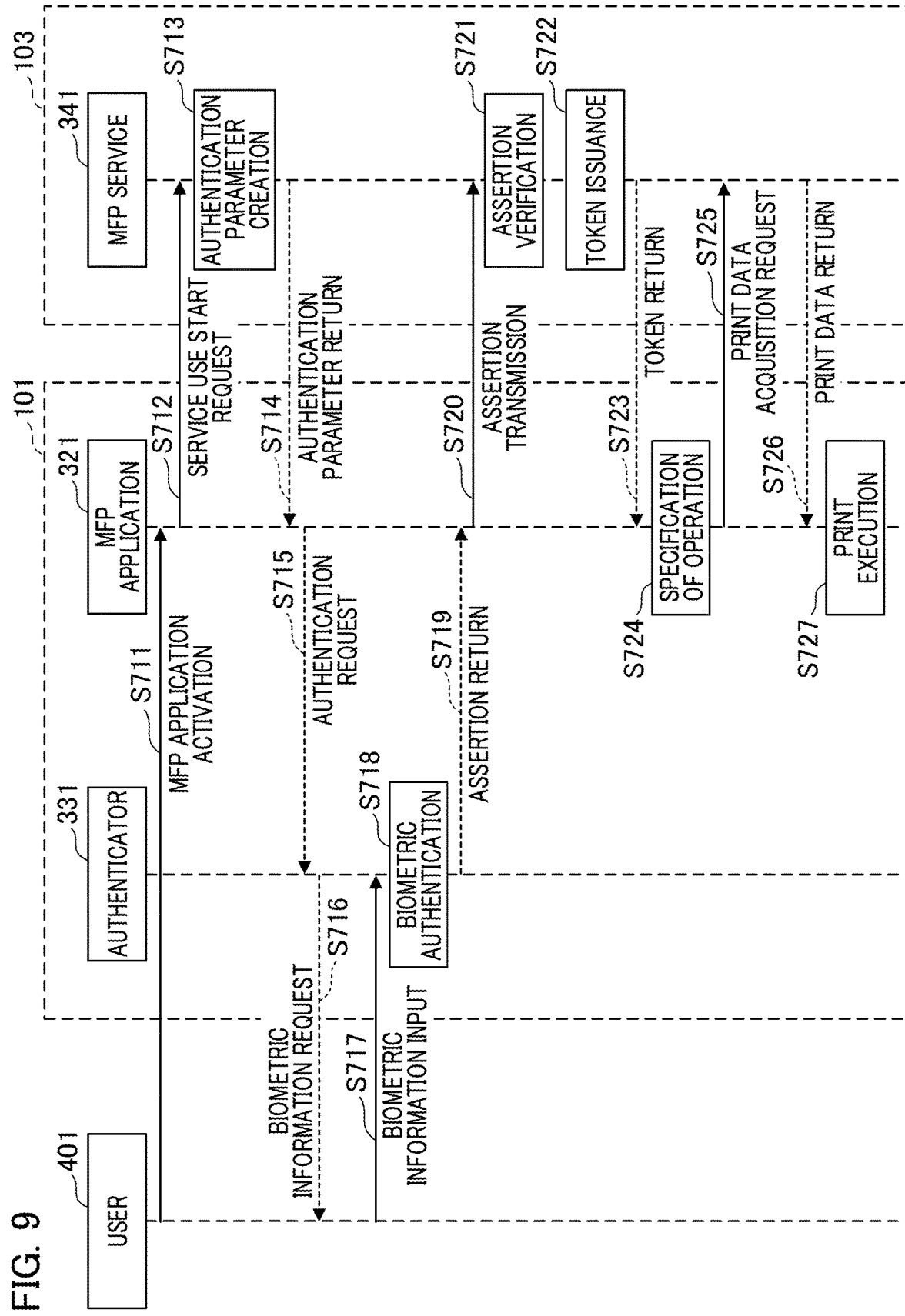
FIG. 9 is a diagram illustrating a sequence of a process at a time of authentication.
Figure 10A:
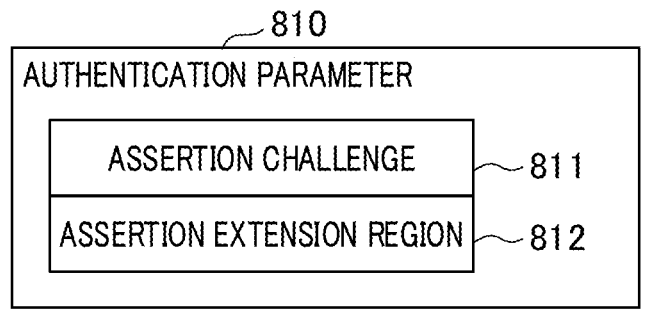
FIGS. 10A to 10C are diagrams illustrating an example of a parameter used at the time of the authentication.
Figure 10B:
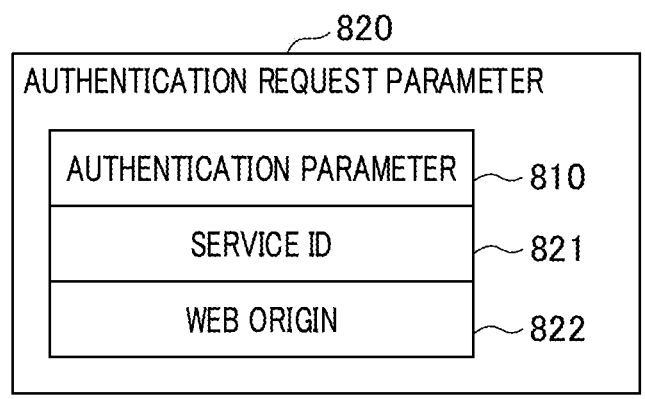
Figure 10C:
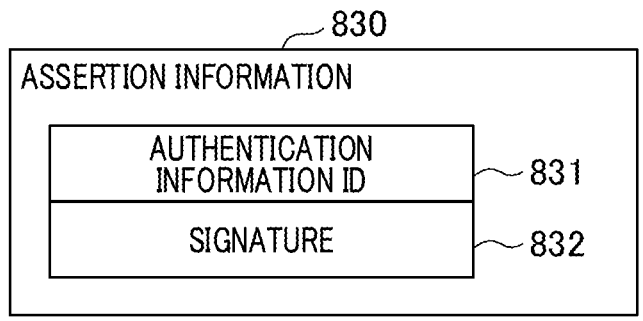
Figure 11B:
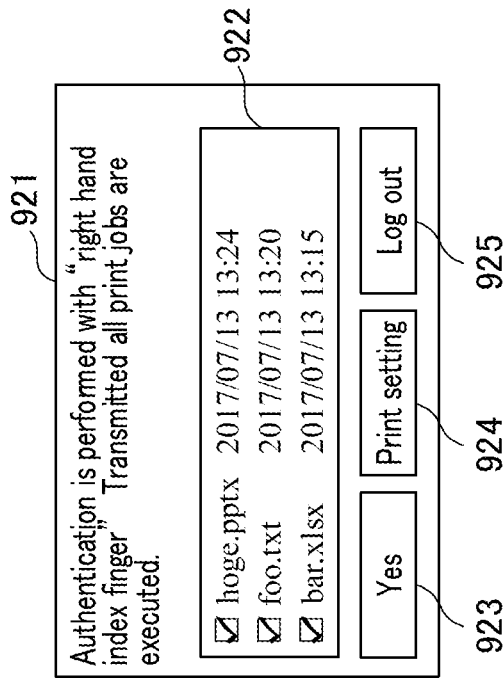
FIGS. 11A to 11C are diagrams illustrating an example of a UI displayed at the time of the authentication.
Figure 11A:
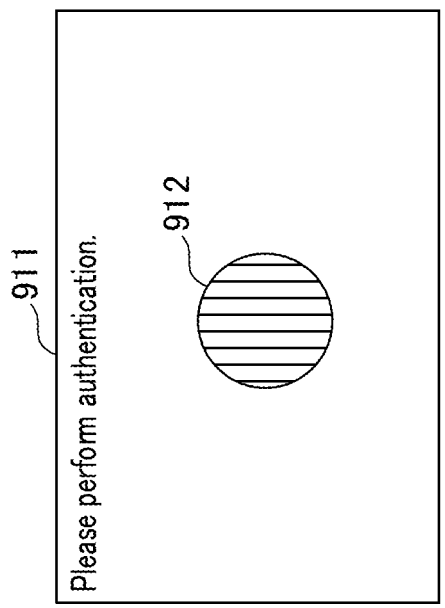
Figure 11C:
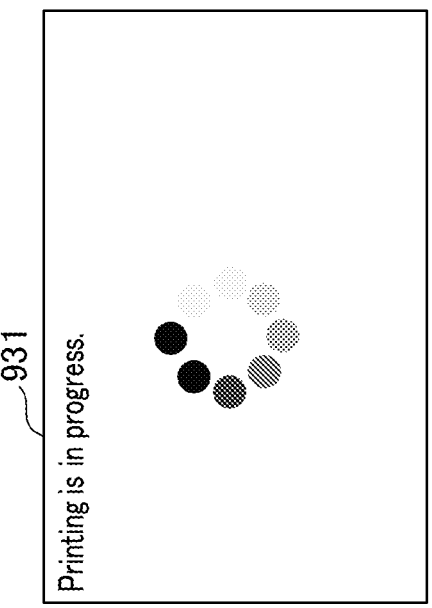

FIG. 9 is a diagram illustrating a process sequence until the registered shortcut operation is executed. In addition, FIGS. 10A to 10C are diagrams illustrating an example of the parameter used in the authentication process performed in the execution of the registered shortcut operation. In addition, FIGS. 11A to 11C are diagrams illustrating an example of the UI displayed by the display unit 322 of the MFP application 321 in the execution of the registered shortcut operation.

First, in step S711 of FIG. 9, the user 401 activates the MFP application 321 through a button, a touch panel, or the like that is the input and output device 232. In step S712, the authenticator authentication control unit 328 of the MFP application 321 requests the MFP service 341 to start the user of the service.

In step S713, the authenticator information processing unit 343 of the MFP service 341 creates an authentication parameter. The authentication parameter is data used when the MFP service 341 authenticates the user 401 using the service. Hereinafter, the authentication parameter will be described.

FIG. 10A is a diagram illustrating an example of the authentication parameter. The authentication parameter 810 includes an assertion challenge 811 and an assertion extension region 812. The assertion challenge 811 stores the verification data to be used for performing the challenge response authentication. The assertion extension region 812 stores an extension parameter that is able to be specified by the MFP service 341 and used by the MFP service 341 to control the operation of the authenticator 331 and the like.

The description is returned to the description of FIG. 9. In step S714, the authenticator information processing unit 343 of the MFP service 341 returns the authentication parameter 810 created in step S713 to the MFP application 321 through the communication unit 352. In step S715, the authenticator authentication control unit 328 of the MFP application 321 transfers an authentication request parameter to the biometric authentication processing unit 333 of the authenticator 331 and performs the authentication request. The authentication request includes the authentication request parameter. Hereinafter, the authentication request parameter will be described.

FIG. 10B is a diagram illustrating an example of the authentication request parameter. The authentication request parameter 820 includes an authentication parameter 810, a service ID 821, and a Web Origin 822. The authentication parameter 810 is the authentication parameter 810 received from the MFP service 341 in step S714. The service ID 821 and the Web Origin 822 are the same as the service ID and the Web Origin of the registration request parameter of FIG. 7B.

The description is returned to the description of FIG. 9. In step S716, the biometric information request unit 335 of the authenticator 331 requests the user 401 for the biometric authentication. In the biometric authentication request, a screen asking the user 401 to input the biometric information is displayed.

A screen 911 of FIG. 11A is an example of the UI displayed by the display unit 322 of the MFP application 321 when the authenticator 331 performs the biometric authentication. A button 912 on the screen 911 is a button for reading the biometric information such as a fingerprint and includes the biometric information sensor 226.

In step S717, the user 401 inputs the biometric information through the biometric information sensor 226 by pressing the button 912 on the screen 911 with a fingerprint (FIG. 11A). Note that here, it is assumed that the user 401 inputs fingerprint information of "right hand index finger" as the biometric information. In the screen 911, a fingerprint is requested as the biometric information, but the biometric information is not limited to a fingerprint. For example, information such as a vein, an iris, a voice print, a face image, or the like is able to be used as the biometric information, and the biometric information is not limited to any of the fingerprint, the vein, the iris, the voice print, the face image, or the like.

In step S718, the biometric authentication processing unit 333 of the authenticator 331 acquires the biometric information input by the user 401. In addition, the biometric authentication processing unit 333 creates the assertion information. The assertion information is data used in the MFP service 341 to verify that the user 401 who performs the request to start a use of the service has not performed an illegal request. Hereinafter, the assertion information will be described.

FIG. 10C is a diagram illustrating an example of the assertion information. The assertion information 830 includes an authentication information ID 831 and a signature 832. Hereinafter, a procedure of acquiring the authentication information ID 831 and the signature 832 configuring the assertion information 830 and creating the assertion information 830 by the biometric authentication processing unit 333 will be described.

In step S717, the biometric information acquired by the biometric authentication processing unit 333 of the authenticator 331 through the screen 911 (FIG. 11A) is compared with the biometric information stored in the TPM 227. As a matching algorithm, a feature point extraction method, a pattern matching method, or the like is used, but in the present invention, the matching algorithm is not particularly limited.

Specifically, the biometric authentication processing unit 333 specifies the record from the authentication information management table (i.e. Table A) managed by the authentication information storage unit 334 based on the acquired biometric information. Since the biometric information ID indicating the acquired biometric information is specified, in the authentication information management table (i.e. Table A), the authentication information ID 831 and the secret key corresponding to the biometric information are specified. That is, the authenticator 331 executes the biometric authentication, and in a case where the authentication is successful, the secret key is extracted.

In addition, the biometric authentication processing unit 333 creates the signature 832 (the signature data) by encrypting the assertion challenge 811 included in the authentication parameter 810 using the specified secret key. In addition, the biometric authentication processing unit 333 creates the assertion information 830 including the specified authentication information ID 831 and the created signature 832.

In step S719, the biometric authentication processing unit 333 returns the assertion information 830 created in step S718 to the MFP application 321. In step S720, the authenticator authentication control unit 328 of the MFP application 321 transmits the received assertion information 830 to the MFP service 341 through the communication unit 326.

In step S721, the authenticator information processing unit 343 of the MFP service 341 verifies the received assertion information 830. Specifically, the authenticator information processing unit 343 decrypts the signature 832 included in the assertion information 830 using the public key that is able to be specified by the authentication information ID 831 included in the assertion information 830. In addition, the verification whether the decrypted value matches the assertion challenge 811 included in the authentication parameter 810 created in step S713 is performed.

Note that the authenticator information management table (i.e. Table E) is used in specifying the public key. In step S722, the token management unit 351 of the MFP service 341 issues the token and stores information related to the token in the token management table (i.e. Table F). In step S723, the token management unit 351 returns the token issued in step S722 to the MFP application 321 through the communication unit 352.

In step S724, the shortcut management unit 329 of the MFP application 321 specifies an operation associated with the biometric information based on the biometric information input by the user 401 in step S717. Specifically, the shortcut management unit 329 specifies the record from the authentication information management table (i.e. Table A) managed by the authentication information storage unit 334 based on the input biometric information.

That is, since the biometric information ID indicating the input biometric information is specified in Table A, the authentication information ID 831 corresponding to the biometric information is specified in Table A. In addition, the shortcut management unit 329 specifies the operation associated with the specified authentication information in the shortcut management table (i.e. Table B) managed by the authentication information storage unit 334.

In step S725, the shortcut management unit 329 transmits the acquisition request of the print data to the MFP service 341. In step S726, the print data processing unit 344 of the MFP service 341 acquires the print data related to the request of the user 401 from the print data storage unit 348, and returns the print data to the MFP application 321. At this time, data for displaying on the screen by the display unit 322 of the MFP application 321 may be acquire from the presentation unit 350 of the MFP service 341 as occasion demands.

A screen 921 of FIG. 11B is an example of the UI displayed by the display unit 322 of the MFP application 321 after the print data is acquired in step S726. In a selection field 922, a list of the acquired print data is displayed. In a case where a button 923 is pressed, the print data selected by a check box in the selection field 922 is printed. At the time of the authentication when the service is used, by the input of the fingerprint information of the "right hand index finger" on the screen 911 of FIG. 11A, a content of the operation or the parameter registered as the shortcut operation associated with the fingerprint information (the biometric information) is displayed on the screen 921.

As described above, the "right hand index finger" is associated with the operation or parameter selected on the screen 621 or the screen 631 of FIG. 8C. Therefore, a setting screen of a state in which all pieces of data that are able to be printed are selected in a check box of the selection field 922 that is a setting screen related to printing is displayed on the screen 921 so that all lists of the print data are printed.

In a case where a button 924 is pressed, the screen transits to the setting screen for performing detailed settings related to printing and a parameter such as the number of sheets and the darkness is able to be set. In a case where a button 925 is pressed, printing is not executed and the user logs out. Here, a case where the button 923 is pressed will be described. In a case where the button 923 is pressed, in FIG. 9, the process proceeds to step S727.

In step S727, printing is executed. Specifically, the print execution unit 323 of the MFP application 321 executes the print process. In addition, the screen transits from the screen 921 of FIG. 11B to the screen 931 of FIG. 11C. The screen 931 shows that printing is being executed. In addition, in FIG. 9, the process proceeds to step S727.

Note that in the present exemplary embodiment, a process for realizing the screen transition described with reference to FIGS. 8A to 8G or FIGS. 11A to 11C is also able to be applied to a system that does not use the authentication method such as the FIDO. A case where the authentication method such as the FIDO is not used is, for example, a case where the biometric authentication is used and an authentication method in which the information associated with the biometric authentication at the information processing apparatus in the hand of the user in the service on the web, for example, the authentication identification information, the public key, or the like is registered in advance is not used. Even in such a case, it is possible to improve operability at the time of using the service by realizing the above-described screen transition in the system using the biometric authentication.

As described above, according to the present exemplary embodiment, it is possible to improve operability at the time of using the web service. For example, it is possible to immediately execute the desired operation after the biometric authentication by registering the shortcut operation and the biometric information in association with each other. In addition, when registering the shortcut operation, since the registration work is able to be executed after the actually executed operation, it is possible to reduce the load of the registration work.

Second Exemplary Embodiment

In the first exemplary embodiment, a case where the shortcut operation associated with the biometric information is invoked based on the biometric information input by the user at the time of the biometric authentication has been described. Specifically, after authenticating the biometric information input by the user on the screen 911 of FIG. 11A, the called shortcut operation is displayed on the screen 921 of FIG. 11B. However, it is possible to register a plurality of associations between the biometric information and the shortcut operations.

For example, in the present exemplary embodiment, as shown in FIG. 8E, the shortcut operations are associated with a plurality of pieces of fingerprint information, respectively. In such a case, there is a possibility that the user forgets which shortcut operation has been associated with which biometric information. Therefore, after inputting the biometric information in FIG. 11A, there is a possibility that an operation that is not intended by the user is invoked. At this time, for example, in FIG. 11B, it is inconvenient to logout by pressing the button 925 or the like, input another piece of biometric information again, and invoke an intended shortcut operation.

Therefore, in the present exemplary embodiment, even in a case where the user inputs the biometric information associated with the shortcut operation that is not intended by the user, it is possible to execute the intended shortcut operation without requiring the user to take any trouble. Note that the description of the parts common to the first exemplary embodiment will be omitted, and, here, only the difference from the first exemplary embodiment will be described.

Figure 12A:
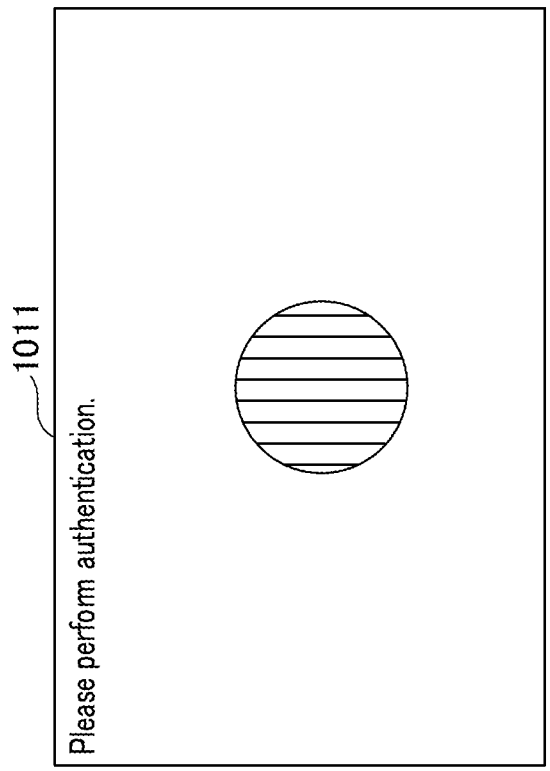
FIGS. 12A and 12B are diagrams illustrating an example of a UI displayed at the time of the authentication in a second exemplary embodiment.

FIG. 12 is a diagram illustrating an example of the UI displayed by the display unit 322 of the MFP application 321 when the MFP 101 uses the MFP service 341. A screen 1011 of FIG. 12A is an example of the UI displayed by the display unit 322 of the MFP application 321 when the authenticator 331 performs the biometric authentication similarly to the screen 911 of FIG. 11A.

Figure 12B:
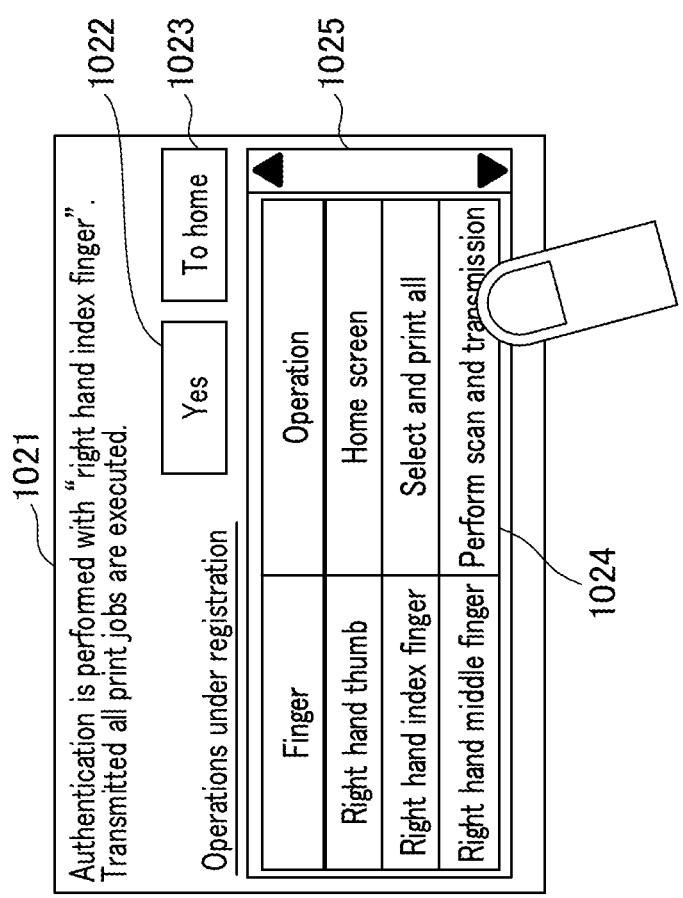

In addition, a screen 1021 of FIG. 12B is an example of the UI displayed by the display unit 322 of the MFP application 321 after the biometric authentication is successful and the print data is acquired in step S726 similarly to the screen 921 of FIG. 11B. In a case where a button 1022 is pressed, the operation associated with the biometric information input on the screen 1011 of FIG. 12A is executed at the time of the authentication when using the service. In the example shown in FIG. 12B, all print jobs transmitted from the server 103 are executed as an operation associated with fingerprint information by the input of the fingerprint information of the "right hand index finger".

In a case where a button 1023 is pressed, the screen transits to the home screen such as the screen 621 of FIG. 8B. Note that since the token is acquired at the time of the authentication when using the service (see the screen 1011), it is unnecessary to return the screen to the home screen and separately perform authentication when executing other operations. Even in a case where the shortcut operation associated with the biometric information input at the time of the authentication is canceled, it is unnecessary to log out or log in again, and other operations are able to be executed.

An operation registered as the shortcut operation and a list of the biometric information for invoking the operation are displayed in an operation list 1024. The operation list 1024 is displayed based on the shortcut management table (i.e. Table B). Another shortcut operation different from the shortcut operation associated with the biometric information input on the screen 1011 of FIG. 12A is able to be executed at the time of the authentication when using the service by selecting the shortcut operation displayed in the operation list 1024.

Note that since the token is acquired from the server 103 at the time of the authentication when using the service, it is unnecessary to separately perform authentication when executing another shortcut operation. It is possible to search for an operation registered as the shortcut operation by operating a scroll bar 1025.

As described above, according to the present exemplary embodiment, even in a case where the user inputs the biometric information associated with the shortcut operation that is not intended by the user, it is possible to execute the intended shortcut operation without requiring any trouble for the user.

Third Exemplary Embodiment

In the first exemplary embodiment, a case where the biometric information and the shortcut operation are associated with each other has been described. However, the input biometric information may be incorrectly registered and the shortcut operation may be associated with erroneous biometric information in some cases. For example, in the screen shown in FIGS. 8E and 8F, the "right hand middle finger" may be actually registered by mistake when the shortcut operation is associated with an unregistered "right hand index finger" in some cases.

As described above, two shortcut operations may be associated with the biometric information of the "right hand middle finger" already registered in association with another shortcut operation. Therefore, in the present exemplary embodiment, in a case where already registered biometric information is doubly registered, the user is notified that the already registered biometric information is doubly registered to suppress registration of the shortcut operation by mistake by the user. Note that the description of the parts common to the first exemplary embodiment will be omitted, and, here, only the difference from the first exemplary embodiment will be described.

FIGS. 13A to 13D are diagrams illustrating an example of the UI displayed by the display unit 322 of the MFP application 321 in the registration process of the authenticator 331 according to the present exemplary embodiment.

Figure 13B:
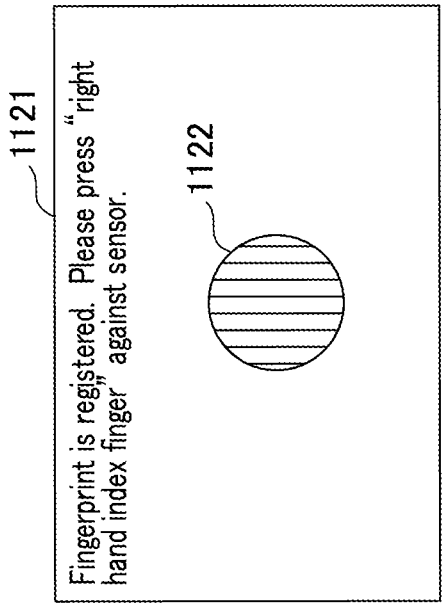
FIGS. 13A to 13D are diagrams illustrating an example of a UI displayed at the time of registration in a third exemplary embodiment.
Figure 13D:
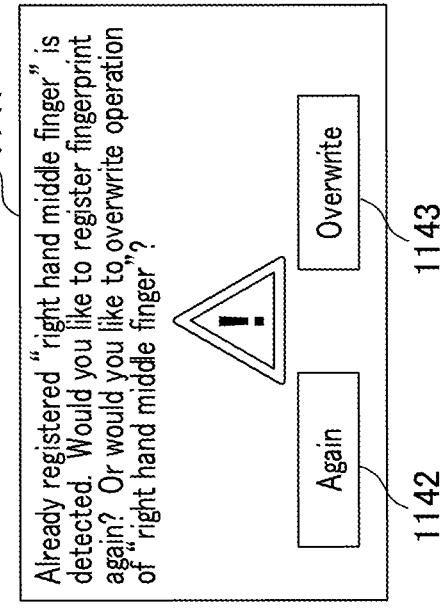
Figure 13A:
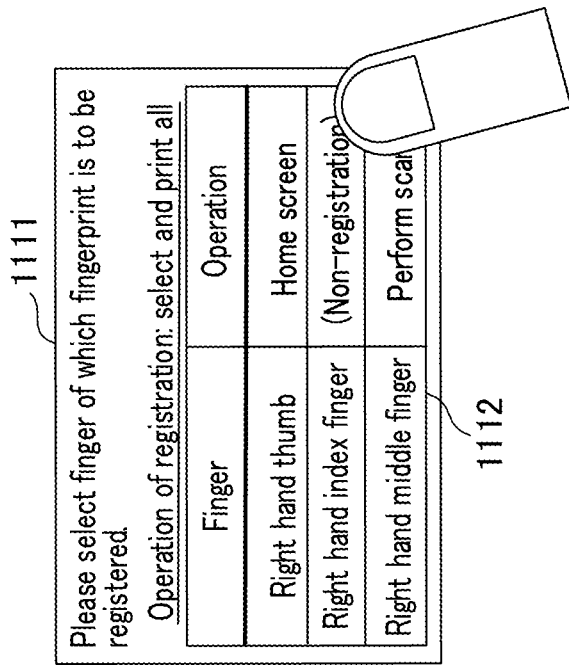

A screen 1111 of FIG. 13A is a screen for registering the shortcut operation similarly to the screen 651 of FIG. 8E. A combination of a currently registered shortcut operation and the biometric information associated with the shortcut operation is displayed in a list 1112 similarly to the list 652.

In a case where the type (or row) of the fingerprint information associated with the shortcut operation is selected from the list 1112, the registration request of the shortcut operation is transmitted to the server 103 (see step S411) and the screen transits to the screen 1121 of FIG. 13B. The screen 1121 is a screen for registering the shortcut operation. A button 1122 is a button for reading the biometric information such as a fingerprint and includes the biometric information sensor 226.

Figure 13C:
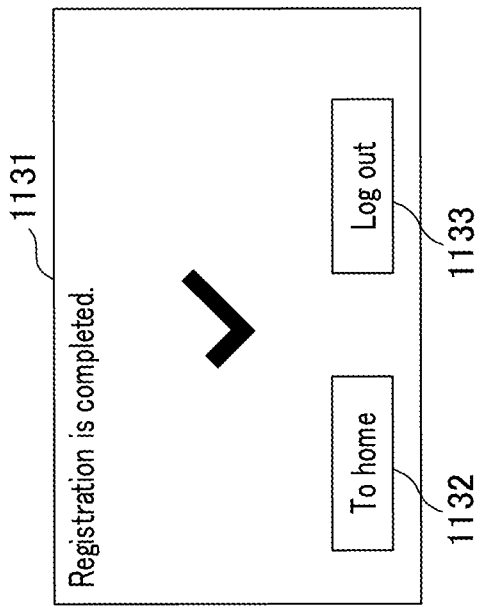

A screen 1131 of FIG. 13C is an example of a screen showing that the registration of the biometric information and the shortcut operation associated with the biometric information are normally completed. In a case where a button 1132 is pressed, the screen transits to the screen 621 that is the home screen. In a case where a button 1133 is pressed, the user logs out. On the other hand, in a case where the biometric information input on the screen 1121 (FIG. 13B) has already been registered in association with another shortcut operation, a screen 1141 of FIG. 13D is displayed and the user is notified that the biometric information input on the screen 1121 has already been registered in association with another shortcut operation.

A screen 1141 is displayed in a case where the already registered biometric information in association with another shortcut operation is detected on the screen 1121. In a case where the button 1142 is pressed, the screen transits to the screen 1111 (see FIG. 13A), and the registration of the shortcut operation is performed again. In a case where a button 1143 is pressed, the registration of biometric information that is newly associated with the shortcut operation that is about to be registered is overwritten with the biometric information that is already registered in association with another shortcut operation.

For example, on the screen 1111 of FIG. 13A, it is assumed that fingerprint information of the "right hand middle finger" is input on the screen 1121 of FIG. 13B despite the "right hand index finger" is selected from the list 1112. In this case, as shown on the screen 1111, since the "right hand middle finger" has already been registered in association with another shortcut operation, a screen 1141 is displayed. Here, in a case where the button 1143 is registered, registration of the shortcut operation that is about to be registered is overwritten as the operation associated with the already registered "right hand middle finger".

Figure 14:
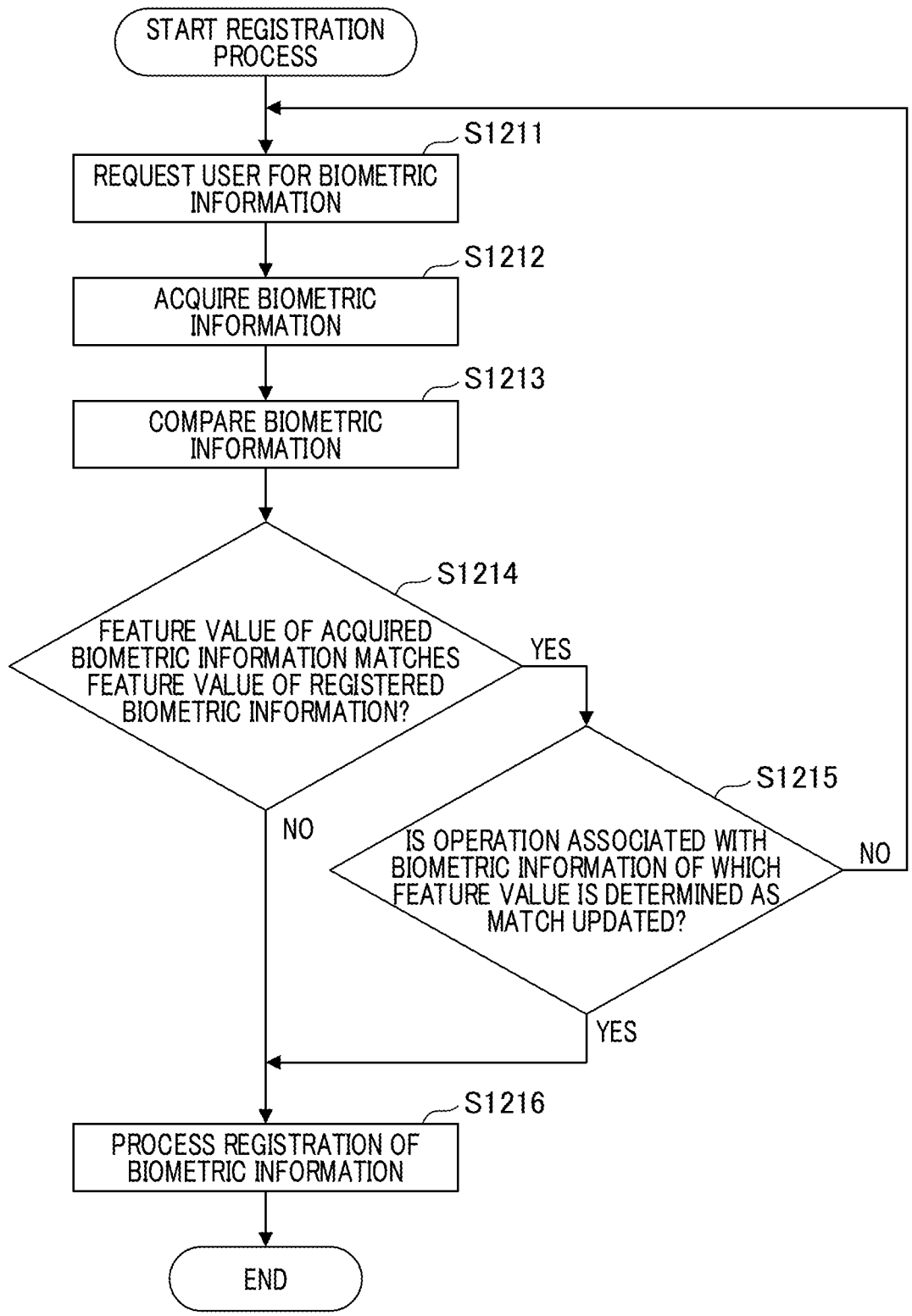
FIG. 14 is a diagram illustrating a process of an MFP at the time of the registration in the third exemplary embodiment.

FIG. 14 is a flowchart for explaining a process of associating the biometric information and the shortcut operation with each other executed by the MFP 101 in the present exemplary embodiment.

Note that in the present exemplary embodiment, the process of FIG. 14 is executed as the process corresponding to steps S416 to S418 in the first exemplary embodiment.

In step S1211, the biometric information request unit 335 of the authenticator 331 requests the user for the biometric information used when executing the shortcut operation to be registered. At this time, the screen 1121 shown in FIG. 13A is displayed. Note that similarly to the first exemplary embodiment, the screen 1121 requests a fingerprint as the biometric information, but the biometric information is not limited to a fingerprint. For example, information such as a vein, an iris, a voice print, a face image, or the like is able to be used as the biometric information, and the biometric information is not limited to any of the fingerprint, the vein, the iris, the voice print, the face image, or the like.

In step S1212, the biometric information request unit 335 acquires the fingerprint information from the user through the biometric information sensor 226. In step S1213, the biometric authentication processing unit 333 compares the acquired biometric information with the biometric information stored in the TPM 227. In step S1214, the biometric authentication processing unit 333 determines whether or not a feature value of the registered biometric information stored in the TPM 227 that matches the feature value of the acquired biometric information is present.

Specifically, in the authentication information management table (i.e. Table A), it is checked whether or not a record matching the feature value of the acquired biometric information is present in the biometric information ID column. In a case where the biometric information of the feature value that matches the feature value of the acquired biometric information is present, the process proceeds to step S1215, and in a case where the biometric information of the feature value that matches the feature value of the acquired biometric information is not present, the process proceeds to step S1216.

In step S1215, since the biometric information ID indicating the acquired biometric information is specified, in the authentication information management table (i.e. Table A), the authentication information ID 831 corresponding to the biometric information is specified. In addition, the shortcut management unit 329 of the MFP application 321 specifies the record corresponding to the biometric information acquired from the shortcut management table (i.e. Table B) using the specified authentication information ID.

At this time, a screen 1141 shown in FIG. 13D is displayed. In a case where the user attempts to register the shortcut operation associated with the biometric information by overwriting the shortcut operation, the user presses the button 1143, and the process proceeds to step S1216. On the other hand, in a case where the user attempts to register the shortcut operation again, the user presses the button 1142, and the process returns to step S1211. That is, the process is started from the input of the biometric information.

In step S1216, the authenticator registration processing unit 332 of the authenticator 331 registers the acquired biometric information. This process is similar to step S418 shown in FIG. 6. The subsequent process is similar to the case of the first exemplary embodiment, and in step S425, the shortcut management unit 329 of the MFP application 321 stores or registers the combination of the biometric information and the shortcut operation in the shortcut management table (i.e. Table B).

Note that in a case where the shortcut operation associated with biometric information is registered by overwriting the shortcut operation, since the authenticator 331 has already been registered in the server 103, the processes from step S419 is not performed.

Fourth Exemplary Embodiment

In the first exemplary embodiment, the shortcut management unit 329 of the MFP application 321 has the shortcut management table (i.e. Table B), and the biometric information and the shortcut operation are managed by associating with each other. However, such data do not need to be managed by the MFP application 321. Therefore, in the present exemplary embodiment, a case where the MFP service 341 manages the biometric information and the shortcut operation in association with each other will be described. Note that the description of the parts common to those of the first exemplary embodiment or the other embodiments will be omitted, and, here, only the difference will be described.

<Difference in Software Configuration>

In the present exemplary embodiment, the shortcut management table (i.e. Table B) described in the first exemplary embodiment is not present on the MFP application 321, and Table G and Table H that will be described later are present on the MFP service 341.

<Difference in Authenticator Registration Process>

In the present exemplary embodiment, the process of registering the authenticator 331 in the MFP service 341 (FIG. 6) is different from the first exemplary embodiment in the following points. In step S422, when the communication unit 326 of the MFP application 321 returns the credential, the communication unit 326 gives association information of the biometric information and the shortcut operation that will be described later to the credential using Table H and transmits the credential. In addition, step S425 is not executed. That is, the registration of the shortcut operation is not performed in the MFP application 321.

<Difference at the Time of Authentication>

In the present exemplary embodiment, in the process (FIG. 9) until the registered shortcut operation is executed, the following points are different from the first exemplary embodiment. In step S724, the MFP application 321 does not specify the shortcut operation. In addition, in step S724, the data required for executing the registered shortcut operation is not requested.

In the present exemplary embodiment, at the time of execution of step S722 or after the execution, the authenticator information processing unit 343 of the MFP service 341 specifies the shortcut operation using Table G and Table H that will be described later, and returns the data necessary for the MFP application 321. The necessary data is, for example, data of a display screen displayed by the display unit 322 of the MFP 101, print data, an operation execution script, or the like. Hereinafter, in the present exemplary embodiment, a table managed by the server 103 will be described.

TABLE G authenticator information/biometric information management table

| Authentication information ID | User ID | Public key | Terminal type | Biometric information |
|---|---|---|---|---|
| 407c-8841-79d | user001 | AC43C5FB-BFA2-48D1-A71B-FB04ACDA347A | printer | right hand thumb |
| 4c04-428b-a7a2 | user001 | 8143CA9F-35C9-4333-948F-BFCE66A74310 | printer | right hand index finger |
| 92b2-498d-bea6 | user001 | 4EA2107F-4027-41D0-B779-A8A30F845266 | printer | right hand middle finger |
| 646b-3cb6-8704 | user001 | 46E80B62-A72D-47C9-BC2A-B052DCAF53FE | tablet | right hand thumb |
| fe35-2cc5-92a1 | user001 | 87DE5A4D-9784-4C15-A2FE-D00A51FA1860 | tablet | right hand index finger |
| 89ae-4f85-a3c1 | user001 | 9C5B5B95-1B7E-B199-489B1BE8B267 | tablet | right hand middle finger |
| ... | ... | ... | ... | ... |

The authenticator information and biometric information management table of Table G is a table managed by the MFP service 341. Table G is a table obtained by extending the authenticator information management table (Table E) of the first exemplary embodiment. An authentication information ID column, a user ID column, and a public key column are similar to those of Table E. A terminal type column stores a type of a device used by the user when registering the authenticator 331 in the MFP service 341. The terminal type is able to be acquired from User Agent or the like transmitted from the device. A biometric information column is similar to the biometric information column of Table B.

TABLE H shortcut operation association table

| Biometric information | Operation |
|---|---|
| right hand thumb | locate home |
| right hand index finger | device_type == "printer" ? print_all_jobs : get_all_print_jobs |
| right hand middle finger | device_type == "printer" ? scan_and_send : take_picture_and)send |
| ... | ... |

The shortcut operation association table of Table H is a table managed by the MFP service 341. Table H is a table corresponding to the shortcut management table (i.e. Table B) managed by the MFP application 321 in the first exemplary embodiment. A biometric information column is an external key for associating Table G and Table H with each other.

An operation column stores an instruction for executing the operation associated with biometric information. In response to a request from the MFP application 321, the authenticator information processing unit 343 executes the instructions at the time of execution of the step S722 or after the execution. Therefore, the authenticator information processing unit 343 acquires data corresponding to the request such as data of a display screen, print data, or an operation execution script from the print data storage unit 348, the presentation unit 350, or the like. The acquired data is returned to the MFP application 321.

As described above, according to the present exemplary embodiment, it is possible to realize the registration and execution of the shortcut operation similarly to the first exemplary embodiment. Hereinafter, as an application example of the present exemplary embodiment, a function that is able to be realized by the MFP service 341 having a table such as Table G and Table H will be described.

<Shortcut Operation Handover>

As described above, in the present exemplary embodiment, the MFP service 341 manages the association information of the biometric information and the shortcut operation. Therefore, it is possible to hand over the association information to a device different from the device that requested the registration of the shortcut operation and perform the same shortcut operation in the different device by using the same user ID.

First to third rows of the authenticator information and the biometric information management table (i.e. Table G) are authenticator information stored when the registration process of the authenticator is performed in the MFP 101. In addition, fourth to sixth rows are authenticator information stored when the registration process of the authenticator is performed in the portable terminal 102 such as a smartphone or a tablet.

Here, it is assumed that, for example, in the MFP 101, shortcut operations are registered in three pieces of biometric information of the "right hand thumb", the "right hand index finger", and the "right hand middle finger", respectively. In addition, a case where the same shortcut operation is registered in the above-described three pieces of biometric information using the same user ID in the portable terminal 102 is considered. At this time, since the MFP service 341 has the tables of Table G and Table H, the MFP service 341 is able to inform the portable terminal 102 of the association between the registered biometric information and the shortcut operation.

For example, when the user registers the shortcut operation in the portable terminal 102, it is possible to perform recommendation to the user so as to hand over the association between the biometric information that is already has been registered in the MFP 101 and the shortcut operation. Therefore, the user also can hand over the association between the biometric information and the shortcut operation used in the MFP 101 to other devices. However, although it is possible to hand over the association information, the registration process of the authenticator is separately required for each device in a handover destination device.

\<Operations Different for Each Device\>

As described above, in the present exemplary embodiment, the user can hand over the association between the biometric information and the shortcut operation to another device different from the registered device. However, since functions of each device are different, there is an operation that is not able to be executed in the handover destination device.

For example, the MFP 101 provided by the MFP service 341 has a print function, but the portable terminal 102 does not have a print function. In addition, although the MFP 101 has a scan function, since the portable terminal 102 has a camera function even though the portable terminal 102 does not have a scan function, the portable terminal 102 includes an image input unit. That is, even in a case where the same service is used, the operations that are able to be executed are different according to the type of the device.

Therefore, in such a case, the value to be stored in the shortcut operation association table (i.e. Table H) managed by the MFP service 341 is controlled so that the handed over operation corresponds to the handover destination device. Here, the operation of a second row of the shortcut operation association table (i.e. Table H) will be described as an example.

The second row of the shortcut operation association table (i.e. Table H) indicates that the shortcut operation related to printing is executed in a case where the authentication is performed using the "right hand index finger" as the biometric information. Specifically, in a case where the terminal type is "printer", the MFP service 341 executes "print_all_obs", and in a case where the terminal type is other than "printer", the MFP service 341 executes "get_all_print_jobs".

In a case where the MFP service 341 executes "print_all_obs", the MFP service 341 returns print data and data necessary for causing the device to execute the print process to the device. In a case where the MFP service 341 executes "get_all_print_jobs", the MFP service 341 returns only the list of print jobs to the device.

Therefore, in a case where the authentication is performed using the "right hand index finger" in the device having the terminal type of "print" having a print function, printing is able to be executed. On the other hand, in a case where the authentication is performed using the "right hand index finger" in the device having the terminal type of "tablet" that does not have the print function, since printing is not able to be executed, it is possible to obtain the list of the print jobs stored in the print data storage unit 348.

As described above, it is possible to provide a service corresponding to the function included in the terminal type by controlling the instruction executed by the MFP service 341 according to the terminal type of the device. Note that similarly to other embodiments, also in the present exemplary embodiment, the biometric information is not limited to a fingerprint, but information such as a vein, an iris, a voice print, a face image, or the like is able to be used, and the biometric information is not limited to any of the fingerprint, the vein, the iris, the voice print, the face image, or the like.

Fifth Exemplary Embodiment

In the first to fourth exemplary embodiments, a case where the device that performs the registration and the execution of the shortcut operation is the MFP 101 has been described, but the present invention is not limited thereto. In the present exemplary embodiment, as an example of other devices, a case where the shortcut operation is executed in the portable terminal 102 such as a smartphone or a tablet will be described.

Note that in the present exemplary embodiment, a hardware configuration of the portable terminal 102 according to the present exemplary embodiment is similar to the hardware configuration of the portable terminal 102 in the first exemplary embodiment shown in FIG. 4. In addition, a software configuration of the portable terminal 102 is obtained by adding the following configuration to the software configuration of the portable terminal 102 in the first exemplary embodiment shown in FIG. 5A.

That is, the portable terminal 102 according to the present exemplary embodiment further includes the authenticator registration control unit 327, the authenticator authentication control unit 328, the shortcut management unit 329, and the authenticator 331 included in the MFP 101 of FIG. 5B. The registration process of the authenticator, the sequence diagram of the authentication process, the configuration of various parameters, the various tables included in each device, and the like described in the first exemplary embodiment are similar to those in the first exemplary embodiment, descriptions thereof will be omitted.

Figure 15C:
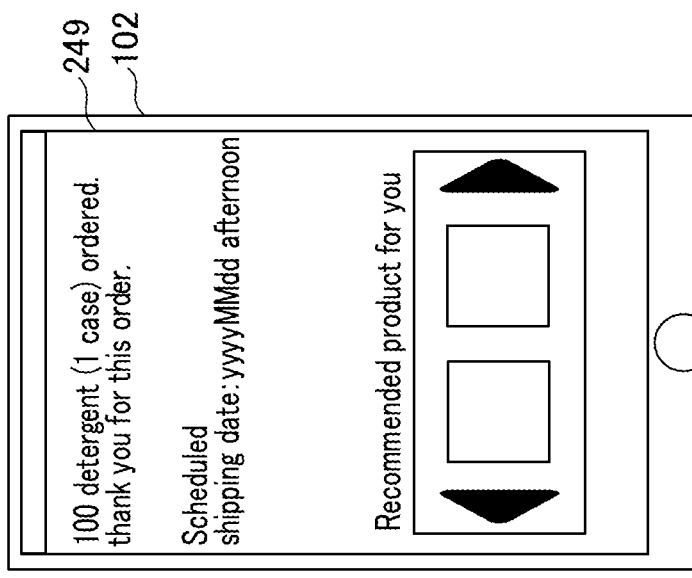
FIGS. 15A to 15C are diagrams illustrating an example of a UI displayed at the time of the authentication in a fourth exemplary embodiment.
Figure 15B:
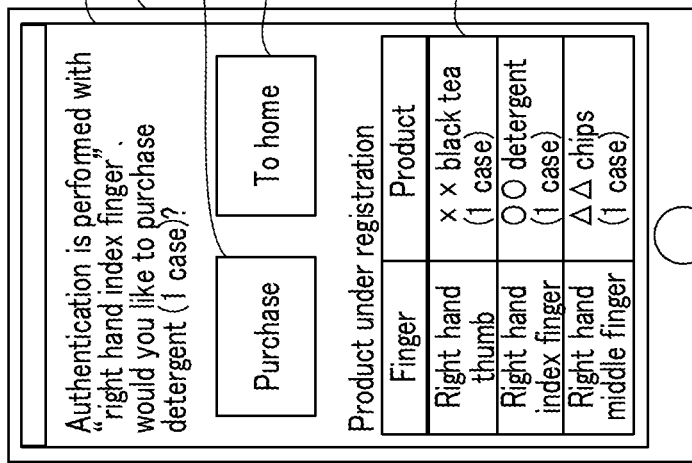
Figure 15A:
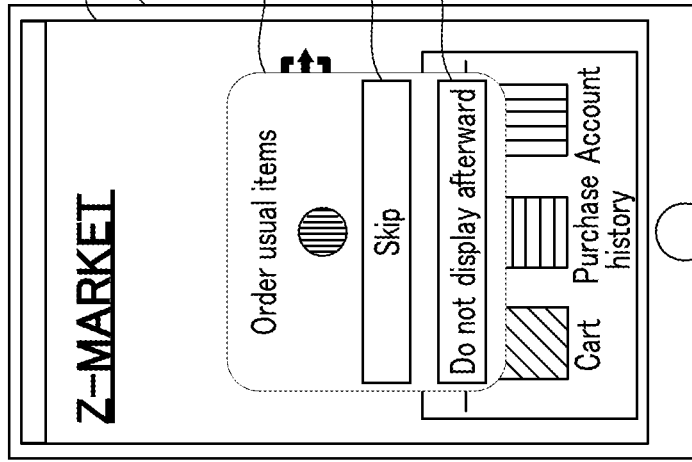

FIGS. 15A to 15C are diagrams illustrating an example of the UI displayed by the display unit 312 of the portable terminal 102 when executing the registered shortcut operation in the portable terminal 102.

In the present exemplary embodiment, it is assumed that the application 311 of the portable terminal 102 is an application that uses a web service corresponding to the MFP application 321 in the first exemplary embodiment.

In addition, in the present exemplary embodiment, a case where the application 311 is a "shopping application" that provides a mail order service as the web service will be described as an example. In the "shopping application", it is possible to register a product that is frequently purchased as the shortcut operation. In the present exemplary embodiment, it is assumed that the registration of the shortcut operation and the registration of the authenticator to the service according to the registration of the shortcut operation have already been completed.

Note that the present exemplary embodiment is able to be applied not only to purchase of a product in a mail order service on the Internet but also to a transaction content in an arbitrary electronic commerce system. For example, in Internet banking, it is possible to register and execute the shortcut operation also in a case where various services are used, such as an inquiry of a balance or a detailed item, or transfer to a predetermined party.

FIG. 15A is a diagram illustrating a UI when the application 311 is activated. A button 1301 is a button for reading the biometric information such as a fingerprint and includes the biometric information sensor 248. Note that also in the present exemplary embodiment, a case where a fingerprint is used as the biometric information will be described, but the present invention is not limited thereto, and information such as a vein, an iris, a voice print, a face image, or the like is able to be used as the biometric information.

A dialog 1311 is displayed when the application 311 is activated. While displaying the dialog 1311, the application 311 receives the input of the biometric information from the user. In addition, in a case where the biometric information associated with the shortcut operation that is registered in advance is input, the application 311 changes to a screen shown in FIG. 15B.

In a case where the button 1312 is pressed, the dialog 1311 is closed without waiting for the input of the biometric information. That is, in a case where the user does not use the shortcut operation, a display of the home screen or the like is performed by pressing the button 1312. Even in a case where the dialog 1311 is closed, when the application 311 is activated again, the dialog 1311 is displayed and the application 311 receives the biometric information.

In a case where the button 1313 is pressed, the dialog 1311 is closed without waiting for the input of the biometric information, and even though the application 311 is activated again, the dialog 1311 is not displayed. Note that even in a case where the button 1313 is pressed, it is also possible to perform change so that the dialog 1311 is displayed again in a setting (not shown) of the application 311.

FIG. 15B is a screen displayed in a case where the biometric information associated with the shortcut operation is input on the screen of FIG. 15A. Here, as an example, a case where the fingerprint information of the "right hand index finger" of which the shortcut operation already has been registered is input and the operation associated with the fingerprint information is displayed will be described. "Purchase of xx detergent (one case)" is associated with a "right hand index finger".

Therefore, in a case where a button 1321 is pressed, the "purchase of xx detergent (one case)" is executed. In addition, in a case where a button 1322 is pressed, display of the home screen is performed without executing the shortcut operation. A combination of the currently registered shortcut operation and the biometric information associated with the shortcut operation is displayed in a list 1323. In a case where a row in the list 1323 is pressed, it is possible to invoke another shortcut operation.

FIG. 15C is a screen displayed after pressing the button 1321 on the screen of FIG. 15B. The application 311 proceeds to a purchase process and notifies a completion of the process on the screen of FIG. 15C by pressing the button 1321.

As described above, according to the present exemplary embodiment, it is possible to use the shortcut operation even in the device different from that of the first to third exemplary embodiments. In addition, the present invention is able to be applied to not only to the MFP application 321 or the application 311 but also to an application corresponding to the authentication method as described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222223, filed Nov. 17, 2017, which is hereby incorporated by reference wherein in its entirety.

What is claimed is:

1. An information processing apparatus comprising:
an authentication module for biometric authentication;
a storage unit having tamper resistance for storing biometric information necessary for performing an authentication process by the authentication module;
a biometric information sensor for reading the biometric information;
a display;
a memory storing instructions; and
a processor executing the instructions stored in the memory to cause the information processing apparatus to:
read first biometric information of a user using the biometric information sensor;
store the first biometric information in the storage unit, in a case where a registration of a content of a first process provided after authentication of the user is instructed;
create a first secret key and a first public key corresponding to the stored first biometric information;
request a registration of the first public key to a server;
store the first secret key in the storage unit;
read second biometric information of the user using the biometric information sensor;
store the second biometric information in the storage unit, in a case where a registration of a content of a second process provided after authentication of the user is instructed;
create a second secret key and a second public key corresponding to the stored second biometric information;
request a registration of the second public key to the server;
store the second secret key in the storage unit;
in a case where the first biometric information is read by the biometric information sensor at a time of another biometric authentication, display a first screen related to the first process on the display in response to success of a signature data verification according to the another biometric authentication using the first public key on the server; and
in a case where the second biometric information is read by the biometric information sensor at a time of another biometric authentication, display a second screen related to the second process on the display in response to success of a signature data verification according to the another biometric authentication using the second public key on the server.

2. The information processing apparatus according to claim 1, wherein the processor further executes the instructions stored in the memory to cause the information processing apparatus to:
create signature data for the signature data verification on the server, wherein the signature data is created using a secret key corresponding to biometric information using the another biometric authentication.

3. The information processing apparatus according to claim 1, wherein the processor further executes the instructions stored in the memory to cause the information processing apparatus to notify that the read biometric information is already associated with another process, in a case where a registration of a content of another process is instructed and biometric information read using the biometric information sensor is already associated with the another process.

4. The information processing apparatus according to claim 1, wherein the processor further executes the instructions stored in the memory to cause the information processing apparatus to display a third screen on which a registration name of the stored biometric information is able to be confirmed on the display.

5. The information processing apparatus according to claim 4, wherein the third screen includes a screen for confirming a registration name of the biometric information stored in the storage unit different from the biometric information read using the biometric information sensor at the time of the authentication, and a process associated with the different biometric information.

6. A system comprising:
an authenticator including an authentication module for biometric authentication, a storage unit having tamper resistance for storing biometric information necessary for performing an authentication process by the authentication module, and a biometric information sensor for reading the biometric information;
a display device; and
a server,
wherein the authenticator creates a first secret key and a first public key in a case where first biometric information of a user is read using the biometric information sensor, and stores the first secret key in association with the first biometric information,
wherein the authenticator further creates a second secret key and a second public key in a case where second biometric information of the user is read using the biometric information sensor, and stores the second secret key in association with the second biometric information,
wherein the server includes one or more memories storing instructions, and one or more processors executing the instructions stored in the one or more memories to cause the information processing apparatus to:
manage the first public key and the second public key for the user; and
perform verification of signature data created by the authenticator, wherein the verification is performed using the first public key in a case where signature data is created at a time of another biometric authentication based on the first biometric information and the verification is performed using the second public key in a case where signature data is created at a time of another biometric authentication based on the second biometric information,
wherein the display device displays a screen related to a first process corresponding to the first biometric information in response to success of the verification performed using the first public key, and
wherein the display device displays a screen related to a second process corresponding to the second biometric information in response to success of the verification performed using the second public key.

7. A method for an information processing apparatus including an authentication module for biometric authentication, a storage unit having tamper resistance for storing biometric information necessary for performing an authentication process by the authentication module, a biometric information sensor for reading the biometric information, and a display, the method comprising:
reading first biometric information of a user using the biometric information sensor;
storing the first biometric information in the storage unit, in a case where a registration of a content of a first process provided after authentication of the user is instructed;
creating a first secret key and a first public key corresponding to the stored first biometric information;
requesting a registration of the first public key to a server;
storing the first secret key in the storage unit;
reading second biometric information of the user using the biometric information sensor;
storing the second biometric information in the storage unit, in a case where a registration of a content of a second process provided after authentication of the user is instructed;
creating a second secret key and a second public key corresponding to the stored second biometric information;
requesting a registration of the second public key to the server;
storing the second secret key in the storage unit;
in a case where the first biometric information is read by the biometric information sensor at a time of another biometric authentication, displaying a first screen related to the first process on the display in response to success of a signature data verification according to the another biometric authentication using the first public key on the server; and
in a case where the second biometric information is read by the biometric information sensor at a time of another biometric authentication, displaying a second screen related to the second process on the display in response to success of a signature data verification according to the another biometric authentication using the second public key on the server.

8. A method for a system:
wherein the system comprises:
an authenticator including an authentication module for biometric authentication, a storage unit having tamper resistance for storing biometric information necessary for performing an authentication process by the authentication module, a biometric information sensor for reading the biometric information;
a display device; and
a server,
wherein the authenticator creates a first secret key and a first public key in a case where first biometric information of a user is read using the biometric information sensor, and stores the first secret key in association with the first biometric information, and
wherein the authenticator further creates a second secret key and a second public key in a case where second biometric information of the user is read using the biometric information sensor, and stores the second secret key in association with the second biometric information;

wherein the method comprises:
  managing, in the server, the first public key and the second public key for the user;
  performing, in the server, verification of signature data created by the authenticator, wherein the verification is performed using the first public key in a case where signature data is created at a time of another biometric authentication based on the first biometric information and the verification is performed using the second public key in a case where signature data is created at a time of another biometric authentication based on the second biometric information;
  displaying, in the display device, a screen related to a first process corresponding to the first biometric information in response to success of the verification performed using the first public key; and
  displaying, in the display device, a screen related to a second process corresponding to the second biometric information in response to success of the verification performed using the second public key.

* * * * *